US009881508B2

(12) United States Patent
Silver

(10) Patent No.: US 9,881,508 B2
(45) Date of Patent: Jan. 30, 2018

(54) COLLISION DETECTION SYSTEM

(71) Applicant: Atlantic Inertial Systems Limited (HSC), Plymouth (GB)

(72) Inventor: Mark Silver, Yelverton (GB)

(73) Assignee: Atlantic Inertial Systems Limited, Devon (GB)

(*) Notice: Subject to any disclaimer, the term of this patent is extended or adjusted under 35 U.S.C. 154(b) by 101 days.

(21) Appl. No.: 14/959,757

(22) Filed: Dec. 4, 2015

(65) Prior Publication Data

US 2016/0171898 A1   Jun. 16, 2016

(30) Foreign Application Priority Data

Dec. 12, 2014   (GB) .................................. 1422172.5

(51) Int. Cl.
G08G 5/04   (2006.01)
G08G 5/06   (2006.01)
G01S 13/93   (2006.01)
G08G 5/00   (2006.01)

(52) U.S. Cl.
CPC .......... G08G 5/045 (2013.01); G01S 13/9303 (2013.01); G08G 5/0021 (2013.01); G08G 5/0078 (2013.01); G08G 5/065 (2013.01)

(58) Field of Classification Search
CPC   G08G 5/04; G08G 5/06; G08G 5/045; G08G 5/065
See application file for complete search history.

(56) References Cited

U.S. PATENT DOCUMENTS

| 2002/0155844 | A1* | 10/2002 | Rankin | ................... | H04W 4/02 |
| | | | | | 455/456.1 |
| 2003/0163280 | A1* | 8/2003 | Steinlechner | .......... | G08G 1/161 |
| | | | | | 702/141 |
| 2010/0070180 | A1 | 3/2010 | Ridenour | | |

(Continued)

FOREIGN PATENT DOCUMENTS

EP   2485206 A1   8/2012
EP   2669706 A2   12/2013

(Continued)

OTHER PUBLICATIONS

Extended European Search Report for European Patent Application No. 15275259.8, dated May 23, 2016, 7 pages.

(Continued)

Primary Examiner — Yonel Beaulieu
Assistant Examiner — Martin A Weeks
(74) Attorney, Agent, or Firm — Kinney & Lange, P.A

(57) ABSTRACT

An aircraft ground collision detection system comprising: an object detection device for mounting on an aircraft and arranged to detect objects and output the location of each detected object; and a processor arranged to: receive the ground speed of the aircraft and the heading of the aircraft and the detected location of each detected object; predict the aircraft's path based on the ground speed and the heading; compare the predicted aircraft path with the object locations; and output an alert based on the overlap or proximity of the predicted aircraft path with the object locations. By predicting the path of the aircraft based on detected ground speed and heading, the system can accurately assess which detected objects pose a collision threat.

18 Claims, 23 Drawing Sheets

(56) References Cited

U.S. PATENT DOCUMENTS

2012/0200433 A1* 8/2012 Glover .................. G08G 5/065
340/971
2014/0288815 A1* 9/2014 Bousquet ................ G08G 5/04
701/301

FOREIGN PATENT DOCUMENTS

EP 2733561 A2 5/2014
JP 2004-216955 * 10/2003 ............. B60K 31/00

OTHER PUBLICATIONS

United Kingdom Search Report, GB Application Serial No. 1422172.5, dated May 21, 2015, 5 pages.

* cited by examiner

```
Set of points (radar point returns)
with the same Object ID from the
         Radar Module.
 Range, azimuth, and elevation
values are provided for each point
```

- Apply worst-case range, azimuth, and elevation tolerance to each point's nominal values to find 8 corners
- Convert range and elevation of each corner to height from ground
- Any corner within height range of interest?
  - Y → For each corner within height range of interest, convert range and azimuth to XY position
  - N → Ignore point
- Any more points with same Object_ID?
  - Y → (back to Apply worst-case...)
  - N → 
- SS ← (Possible) Reduce the set of all points' corners with the same Object_ID to just the extremities of the object

Figure 8

COLLISION DETECTION SYSTEM

TECHNICAL FIELD

This disclosure relates to a collision detection system for aircraft, particularly for large commercial aircraft. The collision detection system is designed to operate while the aircraft is taxiing on the ground, e.g. in an airport.

BACKGROUND

While taxiing large commercial aircraft in congested airports, pilots cannot see their own aircraft's wingtips and find it difficult to accurately judge clearance past obstructions such as buildings, other aircraft, jetways, poles etc. Collisions with such obstructions have occurred every year for many years, and are becoming increasingly frequent as airports become more congested. Needless to say, collisions involving aircraft can cause significant damage which can be expensive, not only in terms of the required repairs, but in terms of the extra time that the aircraft must be out of service while under repair.

Attempts have been made to introduce aircraft ground collision avoidance systems. One example is described in U.S. Pat. No. 6,118,401 which uses radar and/or camera sensors in the wingtips to detect the proximity of objects to the wingtips and to generate an alert based on proximity of the objects.

However the success of such systems has been limited. One reason is that in particularly congested spaces, too many alerts are generated. The pilot may have to steer the aircraft through a very narrow gap. If the collision avoidance system regularly generates alerts for objects that the pilot is aware of and which may be close, but are not actually a collision risk, the pilot may start to pay less attention to the alerts, or even ignore them altogether. In such cases, errors of judgement can once again result in avoidable collisions and expensive damage to the aircraft and/or other objects.

Also, ideally a collision detection system should be able to be retrofitted onto an aircraft, preferably onto a range of aircraft types and should not affect other aircraft equipment. However, this means that the system must be able to operate with information that is available as standard, for example in the ARINC 429 specification. This information includes ground speed and heading, but not nose wheel steering angle, which makes prediction of the aircraft path difficult. Fitting additional sensors to supplement the standard available information adds to the cost and complexity of the system, making it less attractive.

Therefore currently most pilots rely purely on their own eyesight to judge the position of obstacles and the aircraft's current path so as to judge whether or not a collision is likely. This is a difficult task and results in an unacceptable number of collisions. However in order to achieve sufficient uptake, a successful system must be attractive both in terms of applicability and installation and in terms of appeal to pilots.

SUMMARY

According to this disclosure, there is provided an aircraft ground collision detection system comprising: an object detection device for mounting on an aircraft and arranged to detect objects and output the location of each detected object; and a processor arranged to: receive the ground speed of the aircraft and the heading of the aircraft and the detected location of each detected object; predict the aircraft's path based on the ground speed and the heading; compare the predicted aircraft path with the object locations; and output an alert based on the overlap and/or proximity of the predicted aircraft path with the object locations.

By predicting the path of the aircraft based on detected ground speed and heading, the system can accurately assess which detected objects pose a collision threat. An object which is in relatively close proximity to the aircraft, but which does not lie on the path will be detected, but the system is capable of assessing that the object does not pose a collision risk. Accordingly, the system can avoid generating an unnecessary alert, thus reducing the false positive count of the system and providing the pilot with more reliable and informative collision information. Fewer nuisance alerts leads to a lower likelihood of pilots ignoring or taking less notice of the alerts and thus decreases the chances of collision.

Further, as the aircraft path prediction is only reliant on heading and groundspeed information which is readily available, the system can readily be retrofitted onto existing aircraft in a non-invasive manner.

The object detection device is preferably a radar, although ultrasound or other reflection-type object detection systems may be used instead. Such systems are readily available together with suitable object analysis software that identifies objects and outputs object location information.

The system only uses a small amount of aircraft data (which is readily available) plus the radar (or other object detection device) return data in real time, to alert the pilot if any object is in the path of the wingtips. This helps the pilot to invoke the correct procedure to avoid a collision instead of a purely visual assessment. The benefit of the system is magnified in low visibility conditions, such as darkness or fog. In such conditions, the pilot's vision is severely compromised, but the object detection system (e.g. radars) are unaffected.

The aircraft path as it taxis from one place to another may be complicated. However, at any one time its path can be classified as either straight or curved. If the path is curved, its degree of curvature (i.e. radius of turning circle) will depend on the amount of steering being applied by the pilot and may change as a function of time. In a simple collision detection algorithm, the aircraft's path could simply be considered as a straight line at all times, i.e. at a tangent to its turning circle when the aircraft is turning. However, detected objects that are on that straight path may then be flagged up to the pilot even though the aircraft is turning in such a way as to avoid those objects. Equally, objects that are not in a straight line from the aircraft may not show up as collision threats even though the aircraft is currently turning towards them. Therefore preferably the processor is arranged to predict the aircraft path as a curve when the aircraft is turning. By predicting the curved path that the aircraft is actually following, a more reliable prediction of collisions can be made, excluding objects that are not on the path, while including those that are on or near it. Preferably the curved path is always predicted as a circular arc (rather than a more complex curve). Although the steering angle will vary and thus the curved path will vary, these variations are relatively small and slow-changing so the curved path still provides an accurate prediction.

The path of the aircraft could be predicted based on a steering angle of the nose wheel. However, as mentioned above, it is desirable that the system requires minimal integration with other aircraft systems so that it can be easily retrofitted and is not tied to particular aircraft models. Preferably therefore the curve is estimated based on change in heading with time. This calculation may also be based on the aircraft speed. The aircraft heading can be obtained easily from the aircraft systems and is presented in a standard format across many aircraft models, e.g. as specified in the ARINC 429 specification. By monitoring the heading angle, the system can easily calculate change in heading over time and use this to determine the radius of curvature of a turning aircraft. This can then be used in the path prediction of the collision avoidance system.

Many of the obstacles that a taxiing aircraft is likely to encounter are stationary, such as buildings, gantries, parked vehicles or aircraft. However, there are also numerous moving obstacles such as baggage trucks, movable stairs, other moving aircraft, etc. Treating these as stationary objects is a good first approximation of collision likelihood, but on many occasions these moving objects may be moving in a direction and at a speed that means they are not a collision risk. For example a baggage truck may lie directly on an aircraft predicted path and thus to a first approximation would be treated as a collision risk to be flagged up to the pilot. However, if the baggage truck is moving perpendicular to the aircraft path at sufficient velocity, it will be well clear of the aircraft path by the time the aircraft reaches its current location. Preferably therefore the object detection device additionally outputs object velocity information; and the processor is preferably arranged to: receive the object velocity information; predict each detected object's path based on the object's location and velocity; compare the predicted aircraft path with the predicted object paths; and output an alert based on the overlap and/or proximity of the predicted aircraft path with the predicted object path.

Taking into account the object velocity of each object allows the system to be more specific about collision alerts that it generates. Objects that are moving away from the aircraft path can be excluded and objects that are moving towards the aircraft path can be included in further processing and generation of alerts.

With sufficiently accurate velocity and/or position information, the object's predicted paths can be predicted as curves in the same way as described above in relation to the aircraft. However, to keep the cost and complexity of the system relatively low, the accuracy of the position and velocity information cannot reliably predict the correct curvature and therefore the reliability of path intersection may not be sufficient. Therefore, in some examples it is preferred that the processor is arranged to predict all moving object paths as straight lines. As well as increasing the reliability, this simplifies the processing to determine the possible intersection or proximity of the object path with the aircraft path.

Preferably the processor is arranged to calculate object velocity by combining a radial velocity component from the object detection device and non-radial components from change in object position over time. The object detection device such as a radar or ultrasound device will typically output a velocity in the direction to/from the device as determined by Doppler analysis. The velocity of an object can alternatively be calculated based on changes in the position of the object with time. The Doppler velocity component is typically of higher accuracy than the velocity derived from changes in position, but this applies only in the direction to/from the signal source (i.e. radially with respect to the signal source). Components of velocity perpendicular to this radial direction are more accurately obtained via changes in the position of the object. Therefore the best estimate of object velocity is obtained by combining these two measurements so as to make best use of the Doppler component.

In some preferred examples, the processor is arranged to assess object movement for straightness, and if an object is determined to be moving on a non-straight path, its velocity is set to zero for further analysis. As mentioned above, the assessment of curved paths for objects can be difficult and/or unreliable. If the object is assessed to be moving in a non-straight path (e.g. by analyzing its position history), it is not particularly useful to project its movement along a straight path which the object will probably not follow. For simplification therefore it is preferred to treat the object as a stationary object so as not to create unnecessary false positive alerts for the pilot. The object's position will of course still be updated regularly as the system keeps analyzing the scene repeatedly.

Trying to analyse the intersection of two paths (aircraft and object) purely geometrically is difficult and computationally intensive, especially when a large number of objects are involved. It has been found that a more efficient and reliable system is to use an iterative process to assess collision likelihood. Therefore preferably the processor is arranged to compare the predicted aircraft path with the predicted object paths using an iterative process that iteratively predicts aircraft and object positions along their respective paths at points in time and compares the proximity of the aircraft to the objects at each point in time. This process can quickly determine if at any point along the object and aircraft's respective paths there is a likelihood of collision and therefore whether an alert should be generated. The interval between iterations can be varied according to the circumstances, but it is preferred in some examples that the points in time are separated by a time interval of between 0.1 seconds and 1 second, preferably about 0.5 seconds. This provides a good compromise between introducing calculation errors which can occur if too many iterations are performed and providing sufficient accuracy that potential collisions are not missed.

Preferably the processor is arranged to generate no alert where the object does not reach the aircraft's predicted path until after the aircraft is predicted to have passed the intersection of the paths. Where the object path intersects the aircraft path and the object will cross the path before the aircraft arrives, there may be no collision (as the object may continue past and out of collision range), but the situation is still sufficiently risky that it is preferred to notify the pilot.

Preferably the aircraft path is treated as a swept volume of a shape corresponding to the aircraft wing shape. This may be a triangle formed by the leading edges of the wings and a line connecting the rear points of the wings. More complicated shapes may be used if appropriate, but this simple shape covers most aircraft designs. By far the greatest collision risk is of objects with the wings and therefore other parts of the aircraft body can fairly safely be excluded from analysis without undue risk. This again reduces the number of false positives that might be produced by the system.

The aircraft path may include guard bands either side of the wingtips so as to incorporate a margin for error in case of erroneous calculations or object distance measurements from the object detection device for example. The size of the guard bands is of particular importance as too small a guard band results in an increased risk of collisions, while too large a guard band results in too many false positives from objects considered to be in collision with the guard band. In some preferred examples a guard band of at least 1 m is provided.

The system preferably guarantees not to ignore any object that it determines to be in the guard band or on a collision course with it. In other examples a guard band of at least 2 m may be provided. The accuracy of the object detection device is such that a band of less than 1 meter is considered risk, while greater than 3 meters may result in too many false positives. It is believed that pilots will be happy for the TSAS to alert for objects up to 2 m outside the wing, maybe more for some types of object.

In some preferred examples, the processor is arranged to assess the aircraft path for straightness. If the aircraft path is straight, a coordinate system centred on the aircraft is used and if the aircraft path is curved, a coordinate system centred on the centre of the turning circle is used. The path analysis can be facilitated by using a coordinate system that is suitable for both the aircraft and the object. In the case of the aircraft moving in a straight line, there is no centre of turning circle. However processing can be performed easily using a coordinate system centred on the aircraft. The object's predicted path can simply be adjusted to take account of the aircraft's velocity. When turning, the centre of the turning circle of the aircraft provides a fixed point from which both the path of the aircraft and the path of the objects can easily be defined and thus the two paths can be more easily compared.

The information/alerts generated by the system may take different forms. For example, they may be visual or audio alarms or simply the presentation of information. Visual and audio alerts may vary in frequency (tone) or in repetition rate, depending upon the range of the object and/or time until potential collision. In some preferred embodiments, the processor is arranged to generate three levels of information (i.e. three levels of situational awareness for the pilot and/or crew), each level associated with a different range of times until braking is required to avoid a collision. By dividing the information/alerts into three categories, the pilot can be provided with plenty of information while still being warned of particularly high risk incidents. This means that lower risk events can be notified to the pilot without detracting from the pilot's reaction to high risk events, i.e. high risk events are less likely to be ignored or go unnoticed. For example, the highest warning level may be an alert (e.g. audible) to warn of a collision that will take place if braking does not begin within 2 seconds. The second warning level may be an alert to warn of a collision that will take place if braking does not begin within 5 seconds (this may be a visual alert, e.g. a flashing display). The third level warning may correspond to objects that are identified as a collision risk, but are currently sufficiently far away that action is not required for more than 5 seconds. The third level warning may be considered as information for situational awareness rather than an alert. Preferably the third level warning is a visual display only, e.g. of the distance to the object in question. In some preferred examples only the first level alert is an audible alert that will draw the urgency of the event to the pilot's immediate attention.

The object detection device is preferably a radar. Preferably the object detection device comprises a sensor on each side of the aircraft, i.e. one on the right and one on the left. These may be positioned on the aircraft body ahead of the wings. Preferably a display is provided that displays the range to the closest object for each wing.

In preferred examples, objects below a certain height are excluded from further processing before path comparisons are performed. The height corresponds to the height of the lowest part of the wings (including any engines attached thereto) with a suitable safety margin. Objects of low height (such as small posts or low signage) may be picked up by the object detection device, but do not pose any collision risk and should not be flagged up to the pilot.

As mentioned above, preferably the system does not use a nose wheel steering angle as part of the path prediction for the aircraft.

Preferably the system can be retrofitted to an aircraft without requiring modification to any existing aircraft systems.

According to this disclosure, there is provided a method of detecting collisions for a grounded aircraft, comprising: detecting the location of objects around the aircraft; detecting the groundspeed and heading of the aircraft; predicting the aircraft's path based on the ground speed and the heading; comparing the predicted aircraft path with the object locations; and outputting an alert based on the overlap and/or proximity of the predicted aircraft path with the object locations.

All of the preferred features described above in relation to the system apply equally and appropriately to the method of detecting collisions.

BRIEF DESCRIPTION OF DRAWINGS

One or more non-limiting examples will now be described, by way of example only, and with reference to the accompanying figures in which:

FIG. 8 shows the logical flow to identify obstacles and calculate their XY positions;

The examples presented here describe and illustrate the mathematical and geometrical theory underlying the obstruction detection algorithms used in certain implementations of the Taxi Strike Alert System (TSAS) software. These algorithms identify whether an object that has been detected by a radar sensor is a collision threat. The inputs to these algorithms are transmitted onto the ARINC 429 databus by other aircraft systems, and object data from TSAS Radar Modules.

The obstruction detection algorithms described here do not include object detection algorithms that are used to identify objects from radar returns, using filtering, tracking etc. Such algorithms are well known and the object data input to the obstruction detection algorithms used here is taken to be the output from those object detection algorithms. Thus, such object detection algorithms are incorporated into the system, but are not described any further here.

The primary function of the Taxi Strike Alert System (TSAS) is to provide information to the pilot, whilst taxiing, e.g. between a runway and a gate, identifying obstructions which may pose a collision threat to the aircraft.

On receipt of an alert, the pilot is to determine the appropriate corrective action. The purpose of the TSAS is to provide additional situational awareness to the flight crew, and not necessarily to indicate corrective action.

The examples described here are based on radar technology, but it will be appreciated that other ranged sensing may be used instead.

Figure 1:
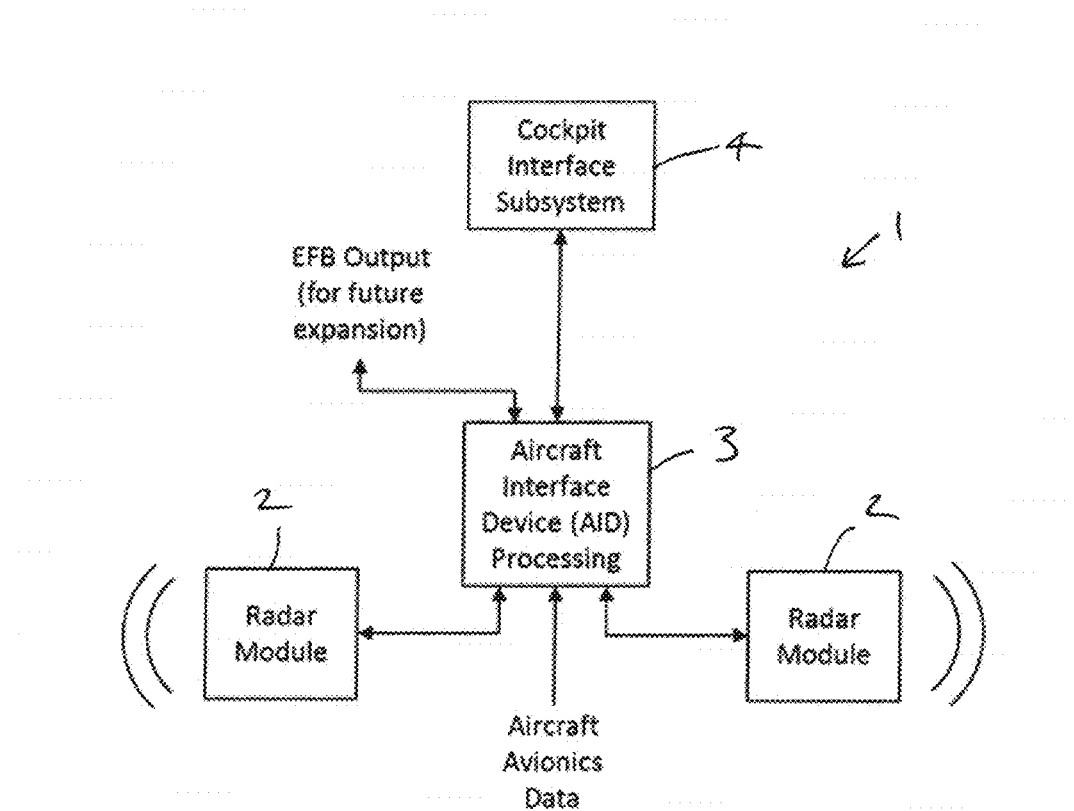
FIG. 1 shows a system block diagram.

FIG. 1 is a system block diagram indicating various system components and their relationships.

The system 1 includes one or more radars 2 on each side of the aircraft's fuselage, an Aircraft Interface Device (AID) 3 in the avionics bay and a Cockpit Interface Subsystem (CIS) 4.

The radar(s) 2 look ahead to detect potential wingtip obstructions. Radar information is sent to the AID 3, which determines if a collision risk exists, and sends a message to the CIS 4 to present a flight deck alert and additional range information for situational awareness.

The inputs of the TSAS AID 4 are listed in Table 1.

TABLE 1

Inputs to obstruction detection algorithm

| Symbol | Description | Units | Source |
|---|---|---|---|
| GS | Aircraft groundspeed | knots | A429 data bus from both inertial and GPS sources |
| H | Magnetic Heading | degrees | A429 data bus from aircraft inertial source |
| R | Range of object relative to Sensor | m | Radar Module |
| Object_ID | Arbitrary integer ID assigned to a group of multiple points recognised by the Radar Module as belonging to the same 'object', such as another aircraft wingtip or a building, and maintained from one processing frame to the next | N/A | Radar Module |

TABLE 1-continued

Inputs to obstruction detection algorithm

| Symbol | Description | Units | Source |
|---|---|---|---|
| $\varphi$ | Azimuth angle of object, relative to the antenna's boresight direction (+means clockwise) | degrees | Radar Module |
| $\theta$ | Elevation angle of object, relative to the antenna's central direction (+means up) | degrees | Radar Module |

The outputs from the algorithm are listed in Table 2.

TABLE 2

Outputs from obstruction detection algorithm

| Description | Units | Destination |
|---|---|---|
| Left Alert Stage | none | TSAS CIS |
| Right Alert Stage | none | TSAS CIS |
| Range Left | m or ft | TSAS CIS |
| Range Right | m or ft | TSAS CIS |

Table 3, Table 4 and Table 5 define various constants used in the example obstruction detection algorithms described here. It will be appreciated that the values provided are examples only and can be varied in accordance with the specific circumstances or goals of a particular implementation.

TABLE 3

Alerting volume requirement constants

| Constant | Description | Value |
|---|---|---|
| GUARD | Wingtip Guard Band: alerting volume width outboard of wingtip (not including sensor tolerance) | 1.0 m |
| KEEP_AWAY | Keep-away distance: predicted final distance between the wing and obstruction when the aircraft stops, if the pilot reacts and brakes as assumed | 5.0 m |

TABLE 4

Aircraft type-specific constants

| Constant | Description | A380 | B777 (-200LR/-300ER/ Freighter) |
|---|---|---|---|
| FWIDTH | Width of fuselage | 7.14 m | 6.2 m |
| PIVOT_Y_POS | Turning circle pivot Y-position (forward distance from swept wingtip) | 12.0 m | 10.2 m |
| WING-FUSE_YPOS | longitudinal distance from the wingtips to the point where the wing leading edges meet the fuselage | 27 m | 19.8 m |
| WINGSPAN | Wingspan | 79.75 m | 64.8 m |
| WING_GRADIENT | Wing gradient (see Error! Reference source not found.) | 0.74 | 0.68 |
| WING_Y_OFFSET | Wing Y-offset (see Error! Reference source not found.) | 29.7 m | 21.9 m |

TABLE 5

Miscellaneous constants

| Constant | Description | Value |
| --- | --- | --- |
| DELTA_HEADING_HISTORY | Length of time over which aircraft heading data is sampled, to determine delta heading | 2.0 s |
| DISPLAY_UNITS | Fixed for each airline | 'metres' or 'feet' |
| GROUNDSPEED_HISTORY | Length of time over which groundspeed is recorded, for noise filtering | 1.0 s |
| HEADING_REFRESH_PERIOD | Update period of aircraft heading data | 25 ms |
| MIN_MOVING_OBST_DIST | If an obstacle is moving towards the aircraft path, TSAS can alert if the obstacle is at least this close to the edge of the path | 150 m |
| MOVING_MAX_HEADING_SD | Maximum standard deviation of obstacle heading, to approximate a straight line - otherwise TSAS will not treat it as a moving obstacle and will not predict its movement | <45° |
| MOVING_MIN_OBST_SPEED | Minimum mean obstacle speed for TSAS to treat it as a moving obstacle and predict its movement | in range 0.1-10 kts |
| OBST_MOVING_HISTORY | Length of time over which obstacle movement is tracked, to determine speed and direction | <10 s |
| REACTION_TIME | Pilot reaction time for 2nd stage alert | 2.0 s |
| RNG_DISP_MAX_TTB | If the predicted time until the pilot has to brake is less than this constant, TSAS will display the range to the obstruction (i.e. an obstacle that is, or will be, in the aircraft path). | 30 s |
| THINK_ACT_TIME | Pilot thinking and acting time for 1st stage alert | 5.0 s |
| TSAS_RESPONSE_TIME | System response time (from presence of obstruction to alert) | 0.5 s |
| TTB_CEILING | Time_Till_Brake maximum value, to limit iterative processing time. | 30 s |
| TTB_INCR | Time_Till_Brake increments when predicting obstacle and aircraft movement towards one another. | 0.5 s |
| TURN_MIN_DELTA_HEADING | Minimum delta heading value, for TSAS to consider the aircraft as 'turning' and predict aircraft movement as an arc instead of a straight line | <1 deg/s |
| WING_YLENGTH | Longitudinal (y-direction) distance of concern behind wingtip leading edge | 5.0 m |

Figure 2:
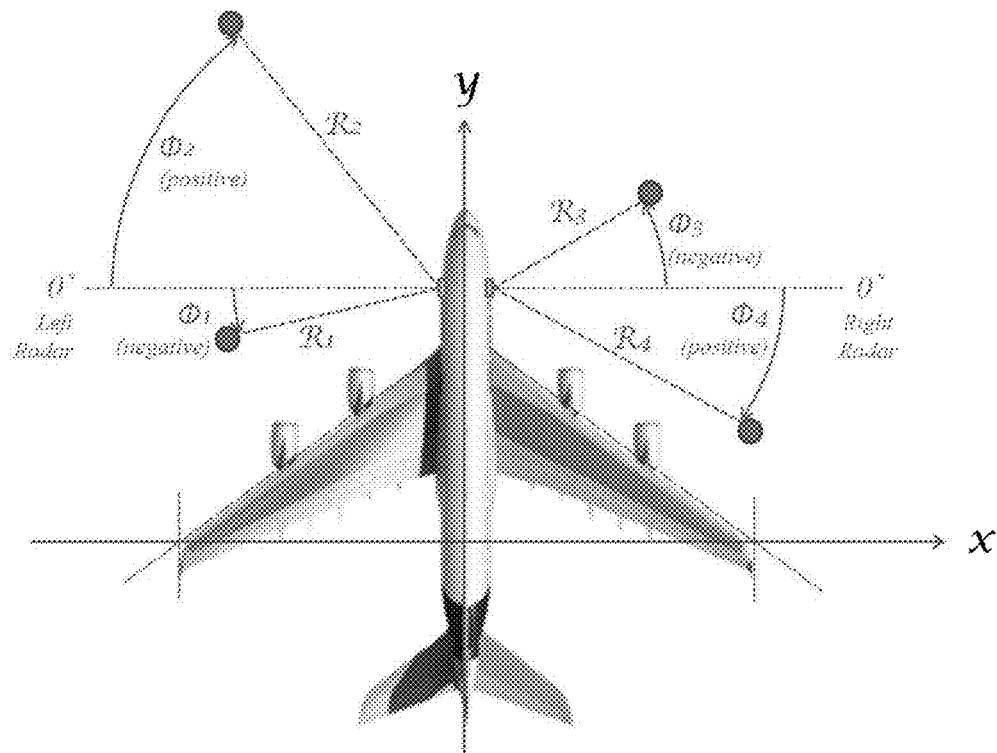
FIG. 2 illustrates a TSAS Radar polar coordinate systems and Cartesian coordinate axes.
Figure 6:
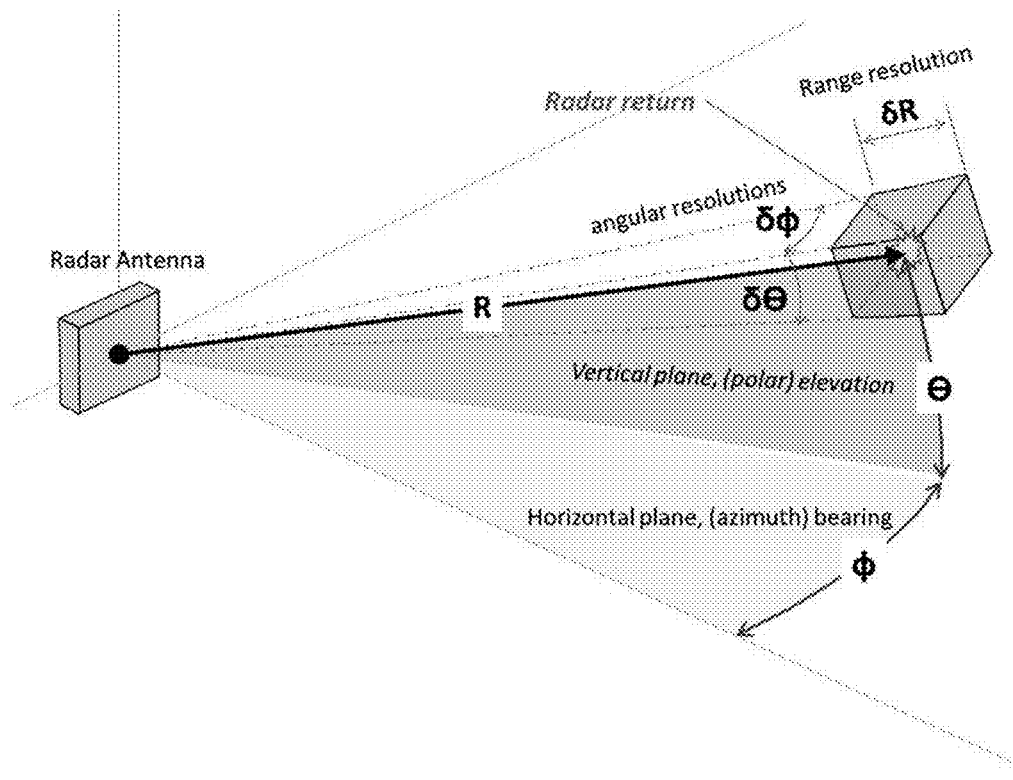
FIG. 6 illustrates radar range, azimuth angle, and elevation angle and tolerances.

Each element of the radar return data consists of nominal values of range, azimuth angle, and elevation angle, as shown in FIG. 6. FIG. 2 shows the range and azimuth angle in the aircraft context.

For the purposes of this algorithm description, the object position data is translated from the polar coordinate system relative to each radar antenna, to a Cartesian coordinate system relative to the aircraft, illustrated in FIG. 2. The y-axis is the aircraft centreline, and the x-axis is a line running through the two wingtips, or more precisely 'squared-off' approximations to the two wingtips, with the wing leading edges approximated to straight lines. The z-axis represents height above the ground.

Conversion to Cartesian XY coordinates from data from the left radar sensor is achieved as follows, using object 1 from FIG. 2 as an example:

$$x_1 = R_1 \sin(-90+\varphi_1) + x_{LeftRadar} \quad \text{Equation 1}$$

$$y_1 = R_1 \cos(-90+\varphi_1) + y_{LeftRadar} \quad \text{Equation 2}$$

Conversion to XY coordinates from data from the right radar sensor is achieved as follows, using object 3 from FIG. 2 as an example:

$$x_3 = R_3 \sin(90+\varphi_3) + x_{RightRadar} \quad \text{Equation 3}$$

$$y_3 = R_3 \cos(90+\varphi_3) + y_{RightRadar} \quad \text{Equation 4}$$

The −90° offset for object 1 is necessary because the AID effectively applies an anticlockwise 90° shift to data from the right radar module, and similarly the +90° offset for object 3 effectively represents a clockwise 90° shift to data from the left radar module.

Figure 3:
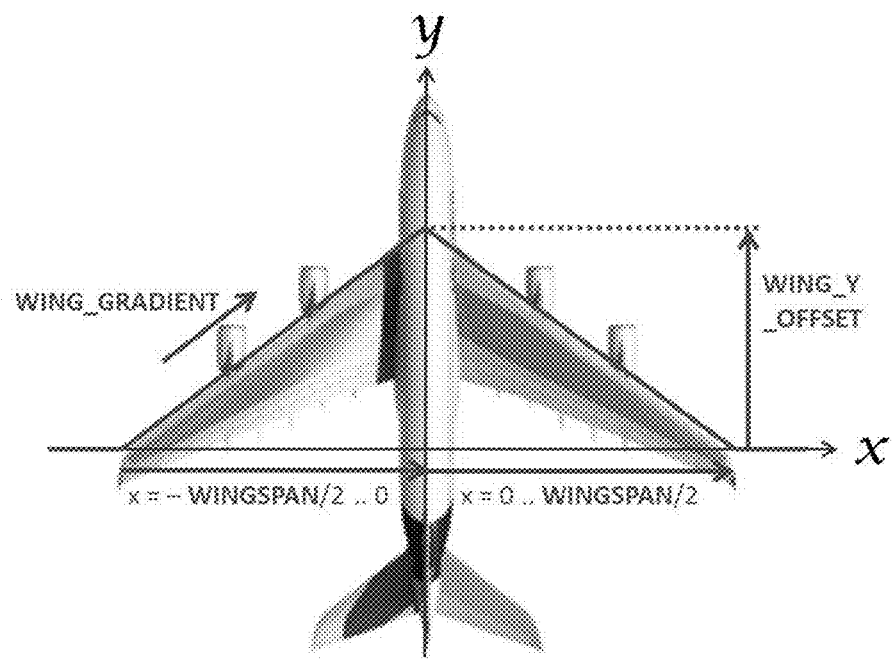
FIG. 3 shows a Wing Line model.

To locate the position on the wing that the obstruction would collide with (hereafter referred to as the "wingtouch" point), an approximation to the wing consisting of a series of straight lines is constructed, as illustrated in FIG. 3 and the following four equations, using three aircraft characteristic constants: WINGSPAN, WING_GRADIENT, and WING_Y_OFFSET. These are illustrated in FIG. 3.

$$\text{for all } x < -\frac{\text{WINGSPAN}}{2}, \quad y = 0 \quad \text{Equation 5}$$

$$\text{for all } x: \ -\frac{\text{WINGSPAN}}{2} < x < 0, \quad \text{Equation 6}$$

$$y = \text{WING\_GRADIENT}.x + \text{WING\_Y\_OFFSET}$$

$$\text{for all } x: \ 0 < x < \frac{\text{WINGSPAN}}{2}, \quad \text{Equation 7}$$

$$y = -\text{WING\_GRADIENT}.x + \text{WING\_Y\_OFFSET}$$

$$\text{for all } x > \frac{\text{WINGSPAN}}{2}, \quad \text{Equation 8}$$

$$y = 0$$

The system constants WING_GRADIENT and WING_Y_OFFSET have been calculated using measured values of WINGSPAN and fuselage width FWIDTH provided in aircraft specification documents, and the longitudinal distance WINGFUSE_YPOS from the wingtips to the point where the wing leading edges meet the fuselage which has been visually estimated using diagrams provided in the same documents. The calculations used were:

$$\text{WING\_GRADIENT} = \frac{\text{WINGFUSE\_YPOS}}{\frac{1}{2}(\text{WINGSPAN} - \text{FWIDTH})} \quad \text{Equation 9}$$

$$\text{WING\_Y\_OFFSET} = \frac{\text{WINGSPAN}}{2} \times \text{WING\_GRADIENT} \quad \text{Equation 10}$$

Figure 4:
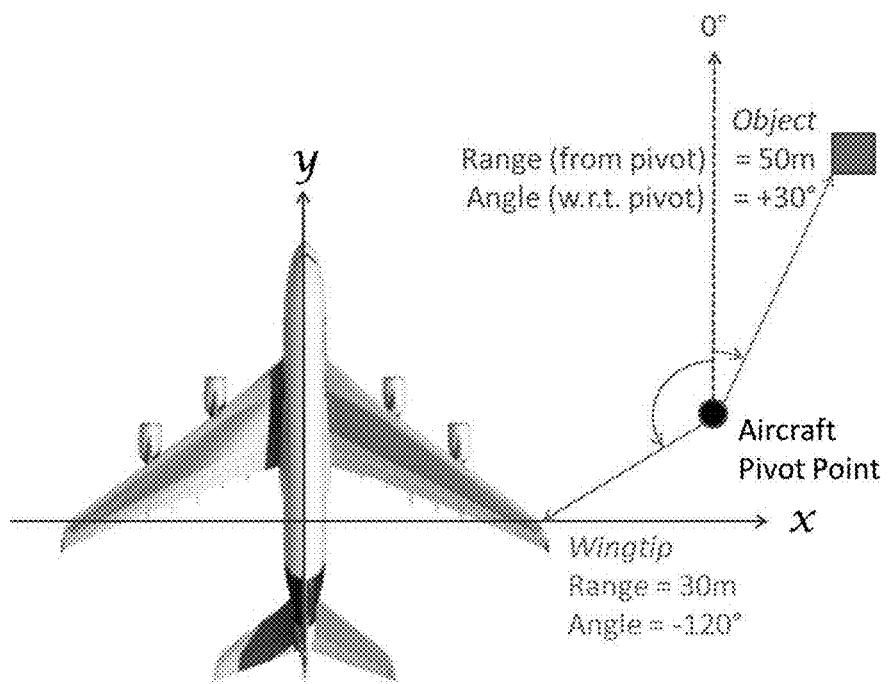
FIG. 4 illustrates a polar coordinate system about the aircraft pivot point.

If the aircraft is turning, a second polar coordinate system is used, with the origin as the centre of the turning circle, illustrated in FIG. 4. All angles in this frame of reference are in the range −180° . . . +180° where 0° represents the forward direction of the aircraft.

Range to the pivot point is always positive and is given by:

$$\text{Range}_{object-to-point} = \sqrt{(x_{object} - x_{pivot})^2 + (y_{object} - y_{pivot})^2} \quad \text{Equation 11}$$

If the pivot point is to the right of the aircraft centreline, as shown in the example of FIG. 4, the angle in degrees with respect to the pivot is given by:

$$\text{Angle}_{object-to-pivot} = 90 - \tan^{-1}\left|\frac{y_{object} - y_{pivot}}{x_{object} - x_{pivot}}\right| \quad \text{Equation 12}$$

And if to the left of the aircraft centreline:

$$\text{Angle}_{object-to-pivot} = -90 - \tan^{-1}\left|\frac{y_{object} - y_{pivot}}{x_{object} - x_{pivot}}\right| \quad \text{Equation 13}$$

Figure 5:
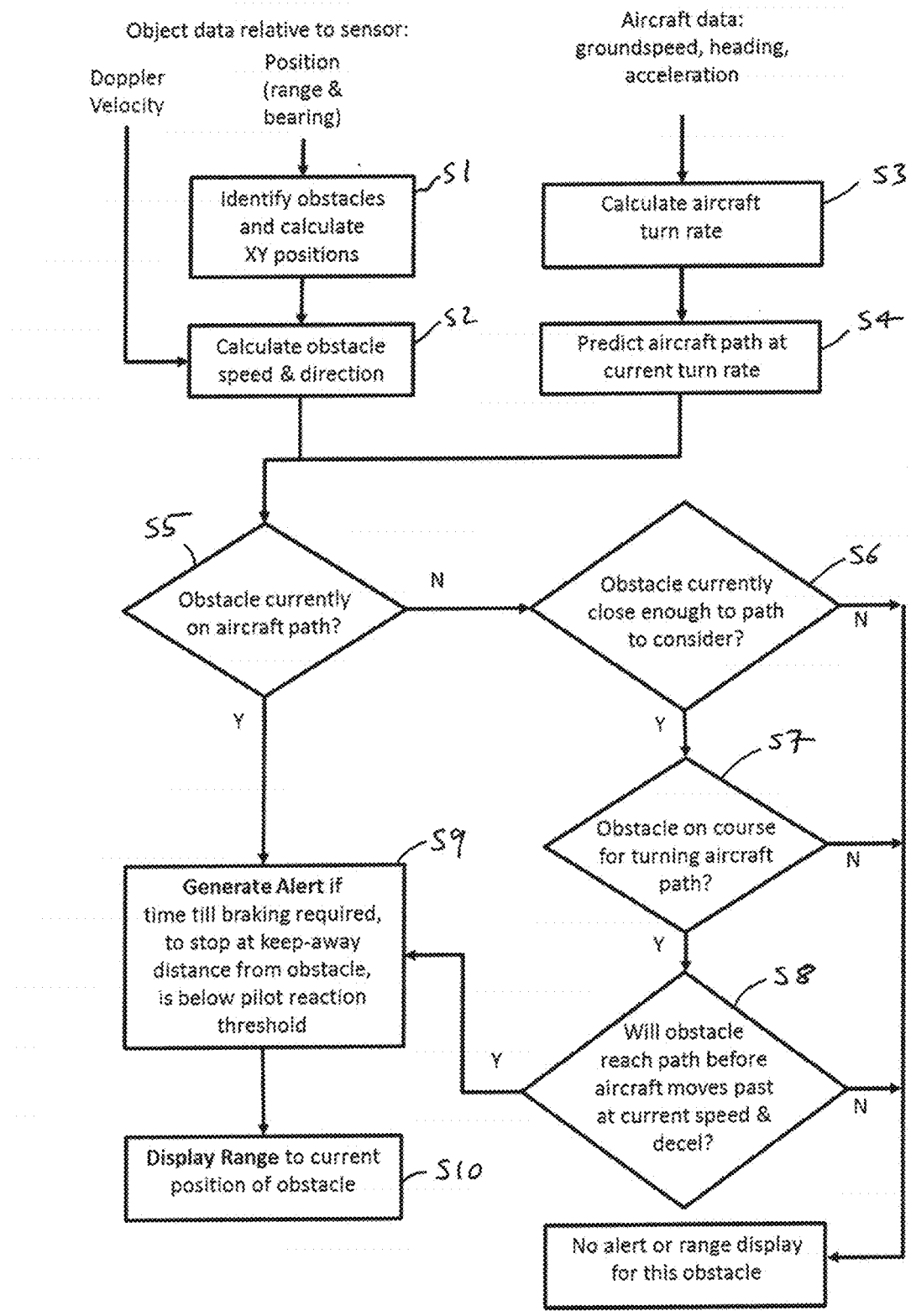
FIG. 5 shows an overview of obstruction detection processing.

The algorithm description can be broken down into a series of steps, as illustrated in FIG. 5. Each step is described in more detail in the following paragraphs.

Step S1 of FIG. 5 is to identify obstacles and calculate XY positions. The purpose of this step is to identify which points and objects detected by the Radar Modules 2 are obstacles, i.e. within the height range of interest, and to convert the radar polar coordinates of each point to aircraft Cartesian coordinates so that the detection formulas deploy the same frame of reference.

The Radar Modules 2 supply object data as illustrated in FIG. 6, representing elevation angle as 0° at the horizontal and as positive angles for an upward direction. The Cartesian coordinate system uses the z axis for height with zero representing ground level (at the aircraft) and positive values above ground level.

It will be appreciated that the software implementation of these algorithms may or may not use the same coordinate systems.

FIG. 8 presents a proposed logical flow for processing the Radar object detection data.

Each element of the radar return data consists of nominal values of range, azimuth angle, and elevation angle, as shown in FIG. 6. Known maximum and minimum tolerances are applied to these three values, to create eight 'corners' of a shape similar to a curved brick.

Objects within the height range of the wingtips, plus an additional height margin above and below this range, are known as obstacles. Only obstacles need be considered in the XY plane and processed further, since objects outside this height range cannot collide with the aircraft wingtips during taxi. Object height above ground level $z_{object}$ is calculated first, based on radar height above ground level and object elevation measured by the radar, as follows:

$$z_{object} = z_{radar} + R \cdot \sin\theta \quad \text{Equation 14}$$

Figure 7:
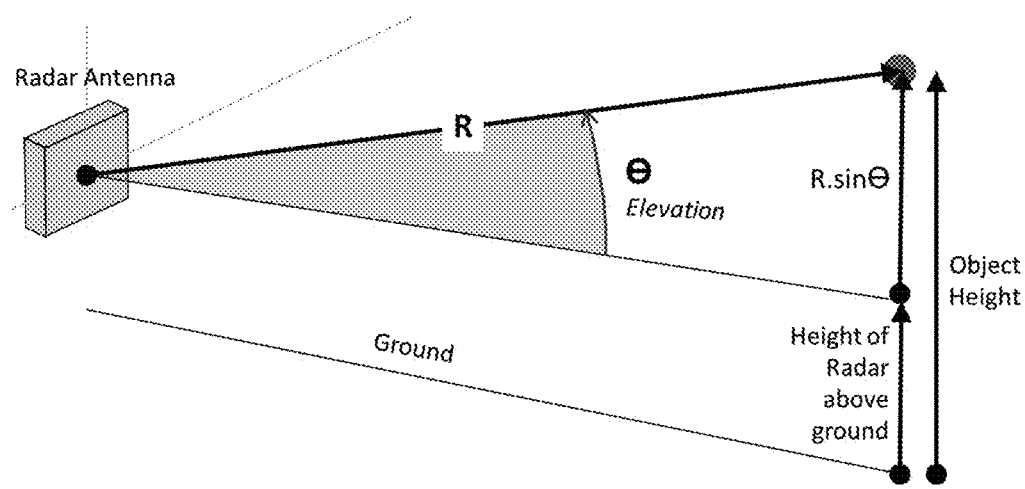
FIG. 7 shows trigonometric calculation of object height.

The object height is compared with a wingtip height range of interest which is fixed for each aircraft, using simple trigonometry as shown in FIG. 7. If none lie within the height range, the point is not an obstacle, and is ignored.

Once this is done for all detected points, obstacle vertical (z-axis) position and velocity are not used any further.

Once all points with the same Object_ID in the whole radar data set have been processed in this way, each obstacle is defined as a set of positions in the horizontal plane. Each position is defined by an X- and a Y-coordinate, derived using equations 1 to 4.

In some examples, to reduce the processing required, the set of points associated with a single obstacle can be reduced by identifying the extremities of the obstacle.

Step S2 of FIG. 5 estimates obstacle linear velocity. Linear obstacle velocity is used for two purposes:
1. To generate an alert if the obstacle is moving towards the path of the aircraft but not currently in its path,
2. To generate an alert more quickly if the obstacle is already in the path of the aircraft and moving towards the aircraft.

The obstacle velocity relative to the aircraft is calculated using a combination of instantaneous Doppler velocity and the recent history of the obstacle's position. Obstacle position is likely to have a resolution of several meters at the range of the wingtip, and delta-position (i.e. change in position with time) is significantly less accurate than Doppler velocity. Therefore only Doppler velocity is used in the direction to which it relates, namely movement towards and away from the sensor, and delta-position information is used only to determine the component of velocity perpendicular to this.

Calculation of obstacle velocity is one of the most challenging requirements of the Detection Software given the limitations in resolution and accuracy. In some examples obstacle velocity estimation may be omitted and the system may only respond to the current position of obstacles in the path of the aircraft.

The algorithm described here contains a number of safeguards against nuisance faults:
  It does not attempt to predict curved obstacle trajectories, and will only anticipate a future obstruction if an obstacle appears to be travelling in a straight line (standard deviation of heading below a threshold);

obstacles not travelling in a straight line can only trigger alerts based on their current position, so the obstacle speed is assessed as zero.

It does not attempt to predict changes of velocity, and instead predicts that obstacle velocity will remain constant.

It ignores all obstacles more than a threshold distance away from the aircraft path. This threshold can be tuned according to the circumstances.

Figure 9:
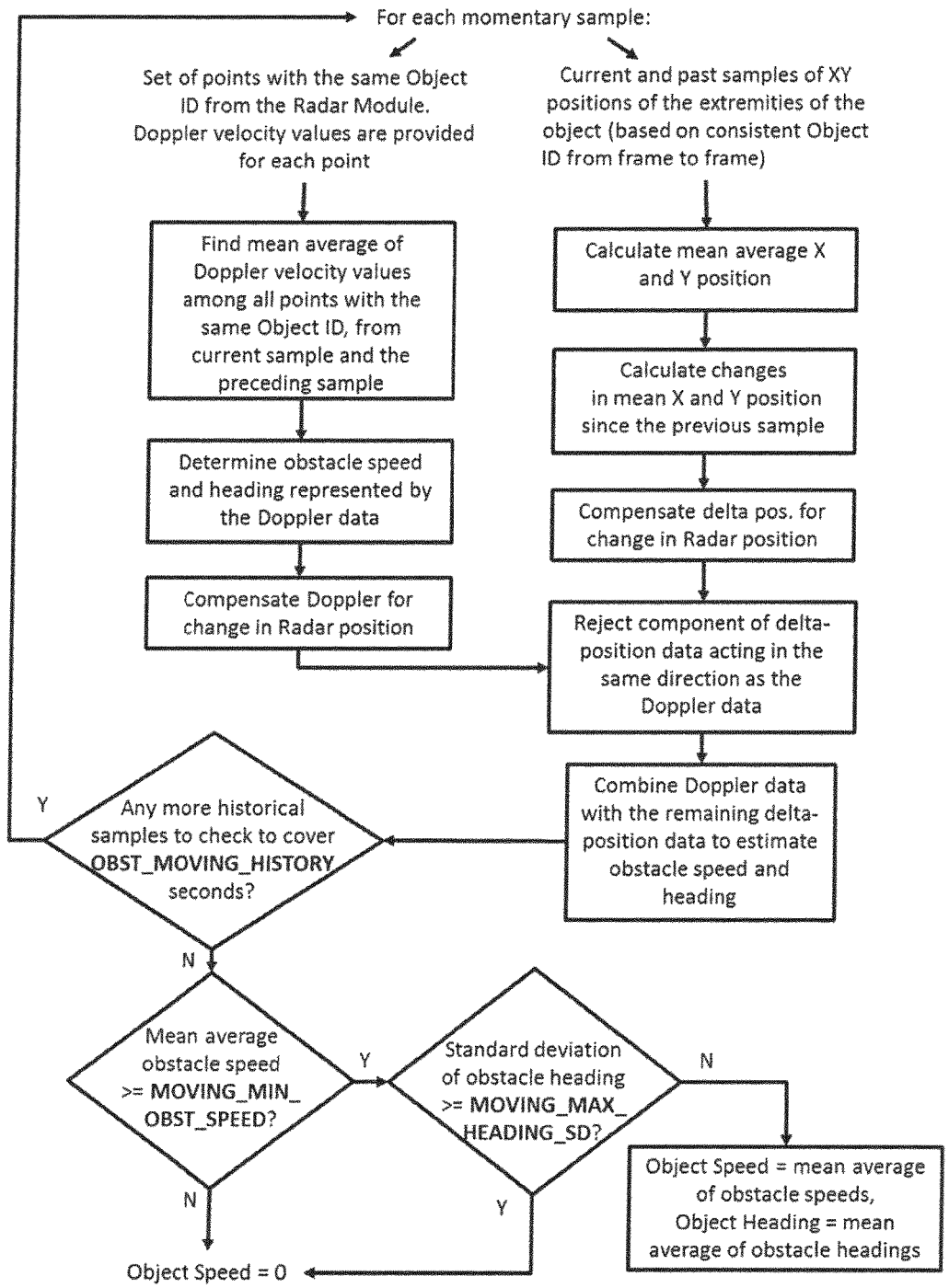
FIG. 9 shows an example logical flow to estimate obstacle linear velocity.

Any or all of the above three safeguards may be used, individually or in combination. This processing may be performed by the Radar Module 2, and the Radar Module 2 will then supply values of Object Speed and Object Heading (as an angular direction with respect to the Radar Antenna boresight) to the AID 3. FIG. 9 provides an example of a logical design flow to illustrate and aid understanding of the principle.

Step S3 of FIG. 5 calculates aircraft turn rate. The TSAS system 1 reads the aircraft magnetic heading and groundspeed from existing aircraft equipment over an ARINC 429 bus. Assuming the equipment complies with the standard ARINC 429 specification, this data is refreshed at intervals of either 25 ms or 50 ms. It will be appreciated that other equipment and standards may be used in other examples.

Figure 10:
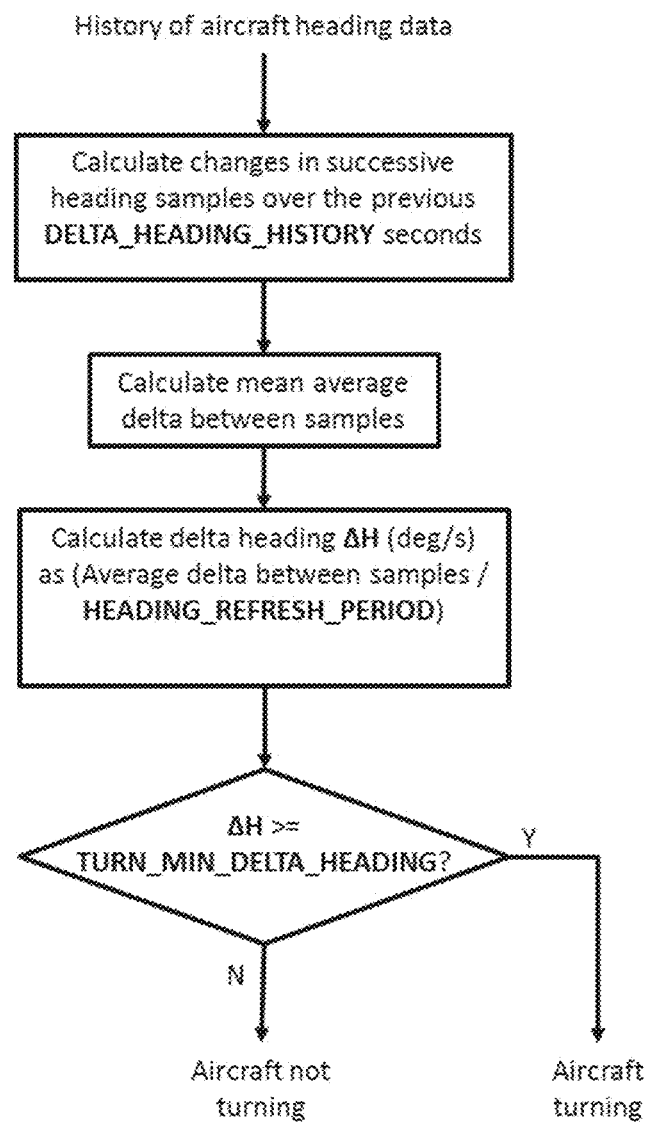
FIG. 10 shows the logical flow to calculate aircraft turn rate.

The recent history of magnetic heading readings is translated into a rate of change of heading, in degrees per second, as shown in FIG. 10. For instance, if the heading refresh period is 0.025 seconds (40 samples per second), and the change in heading is assessed over a DELTA_HEADING_HISTORY of 2 seconds, then a total of 80 changes from sample to sample are calculated, averaged, and converted into a rate of change per second by dividing by 0.025.

The intention of this process is to filter out noise.

Step S4 of FIG. 5 predicts the aircraft path.

Groundspeed

Groundspeed is converted from the aircraft units (knots) to meters per second as follows:

$$GS(m/s) = 0.5144 * GS(knots) \quad \text{Equation 15}$$

It is also averaged over GROUNDSPEED_HISTORY seconds to filter out any noise.

Braking Distance Calculation

For the purposes of generating obstruction alerts, the aircraft speed is predicted as changing over time as follows:

Continuing at its current speed for some length of time (even if the aircraft is currently accelerating or decelerating), and then Braking to a stop.

For these purposes, braking deceleration is predicted based on an assumed correlation with aircraft speed alone (regardless of turn rate). Note that measured aircraft deceleration is not considered. This allows the system to operate based on readily available information and does not require deep integration with existing aircraft systems.

The algorithm calculates braking distance based on this deceleration using a discretised, cumulative process. First, an array of deceleration values at each speed value is constructed, using a resolution initially chosen as 0.1 knots (since the requirement is defined in knots).

Second, a corresponding array of braking times over each speed decrement, e.g. from 10.2 knots to 10.1 knots, with each element of the array calculated as follows:

$$t_{brake\_over\_decr}(s) = \frac{\text{Speed decrement (kt/s)}}{\text{Decel (kt/s}^2\text{)}} \quad \text{Equation 16}$$

where deceleration is converted from multiples of g (acceleration due to gravity) to m/s using the conversion factor 1 g=9.81 m/s$^2$, and then to kt/s$^2$ using the inverse of the conversion factor given in equation 15.

The average speed during each decrement is approximated to speed halfway through the time for that decrement, that is:

$$Speed_{ave\_in\_decr}(m/s) = Decel(m/s^2) * \frac{t_{brake\_over\_decr}(s)}{2} \quad \text{Equation 17}$$

Thirdly, the distance travelled during each of these braking time increments is calculated as:

$$d_{brake\_over\_decr}(m) = \frac{Speed_{ave\_in\_decr}(m/s)}{t_{brake\_over\_decr}(s)} \quad \text{Equation 18}$$

Finally, the $d_{brake\_over\_decr}$ values for all speeds between zero and the current aircraft speed are added together to find the total braking distance.

In some examples, to reduce the amount of processing performed in the AID 3, this calculation can be performed for all speed values in the design phase, and a lookup table of braking times from each value of aircraft speed can be embedded in the software.

Pivot Point Location

If the aircraft is turning, its path is predicted with reference to the 'pivot'—the centre of the aircraft turning circle—as described with reference to equations 11-13 above. The pivot location in the XY coordinate system must be identified, to allow obstacle and aircraft positions to be translated to a polar coordinate system with the pivot as the origin.

Figure 11:
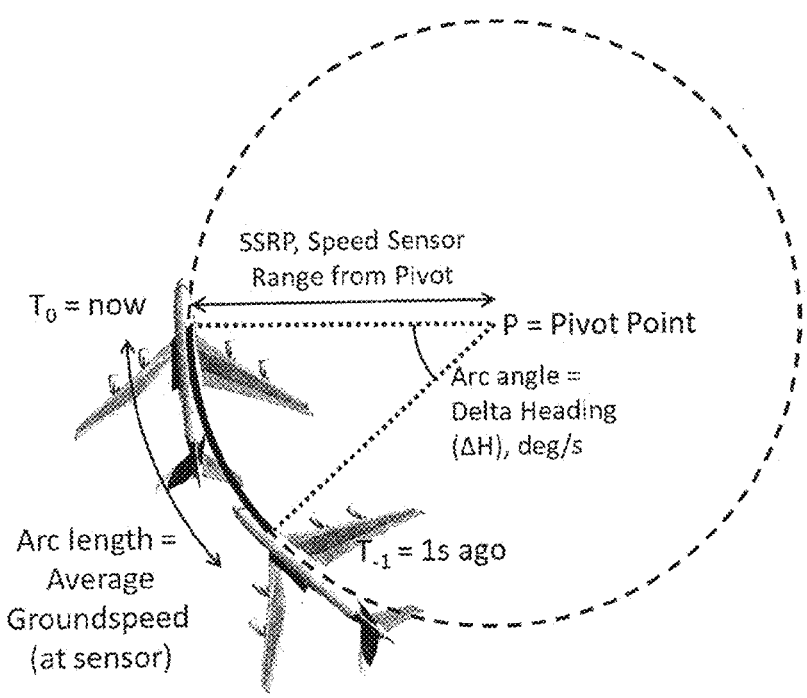
FIG. 11 illustrates prediction of the turning aircraft path.

The aircraft turning circle can be drawn using an arc representing the aircraft movement over the previous one second, as shown in FIG. 11. Using only data available to the TSAS 1 on the aircraft bus, the length of the arc is equal to the average groundspeed during this time, and the angle turned over this arc is equal to the change in heading—the delta heading—from one second earlier.

The ratio of the arc length to the circumference of the circle is equal to the ratio of the arc angle to the whole circle angle, i.e.

$$\frac{GS_{ave}}{2\pi \cdot \text{radius}} = \frac{\Delta H}{360°} \quad \text{Equation 19}$$

Therefore, the algorithm calculates the pivot point's range from the groundspeed sensor as:

$$SSRP = \frac{GS_{ave}}{2\pi} \cdot \frac{360°}{\Delta H} \quad \text{Equation 20}$$

Where: $GS_{ave}$=the average groundspeed (m/s) over the past second,

SSRP=Speed Sensor Range from Pivot (m), $\Delta H$=Delta Heading (deg/s).

Figure 12:
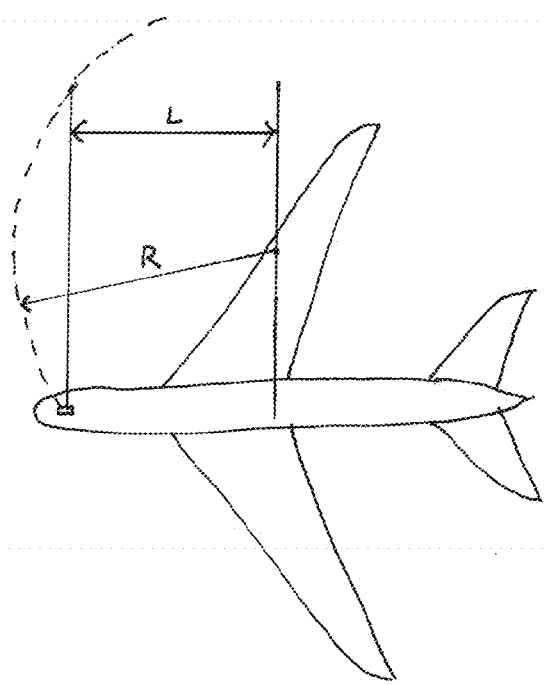
FIG. 12 illustrates the fixed distance of pivot point behind the nose gear on an A380.
Figure 13:
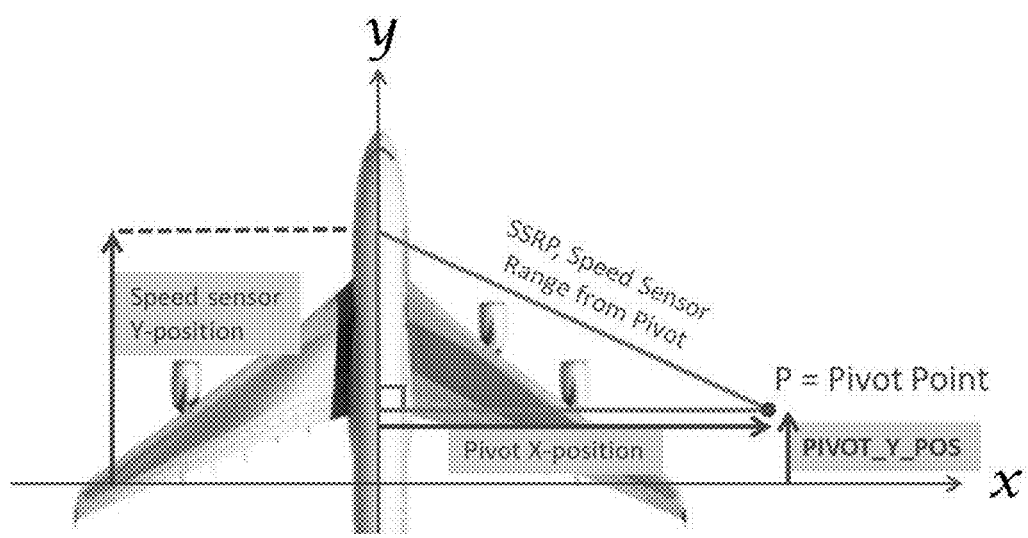
FIG. 13 illustrates derivation of the aircraft turning circle pivot point.

The pivot point is not necessarily at the same longitudinal position as the speed sensor. Certain calculations for an Airbus A380 and a Boeing 777 have been made and identify the pivot point as always lying somewhere on a line that runs across the aircraft, at a known distance L behind the nose gear (illustrated in FIG. 12), from which the Y-position of the pivot point has been determined as a system constant PIVOT_Y_POS. This may not always hold true at high levels of aircraft thrust, or if sideslip occurs during a turn, but these effects are assumed to be negligible during taxiing.

The X-position of the pivot point is calculated, taking the SSRP to be the hypotenuse of a right-angled triangle with the pivot point and the aircraft centreline, using this equation:

$$x_{pivot} = \sqrt{SSRP^2 - (y_{speed\_sensor} - y_{pivot})^2} \qquad \text{Equation 21}$$

Figure 14:
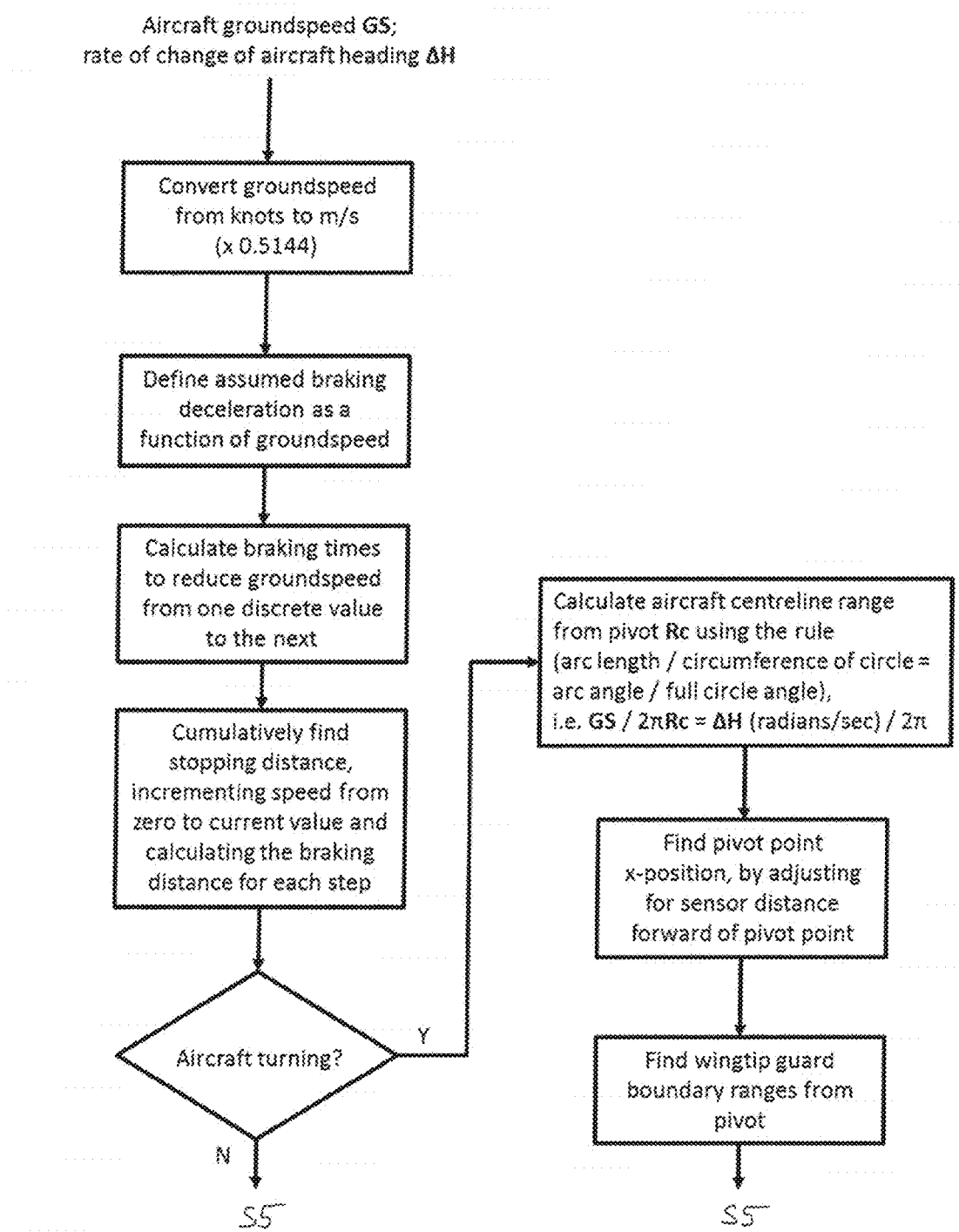
FIG. 14 shows the logical flow for predicting aircraft path.

FIG. 14 shows the logical flow.

step S5 of FIG. 5 assess whether the obstacle is currently on the aircraft path. The predicted aircraft path is the area swept by the wings, and the guard bands outside the wingtips, assuming the aircraft continues at its current rate of turn. The shape of the path is a rectangle if the aircraft is not turning, or arced if the aircraft is turning.

In either case, in order to calculate the width of the aircraft path, the distance from the aircraft centreline to the edge of the aircraft path, i.e. to each Wingtip Guard Boundary (WGB—the limit of the alerting volume outside each wingtip), is calculated as:

$$d_{centre\_to\_WGB} = \frac{WINGSPAN}{2} + GUARD \qquad \text{Equation 22}$$

Figure 15:
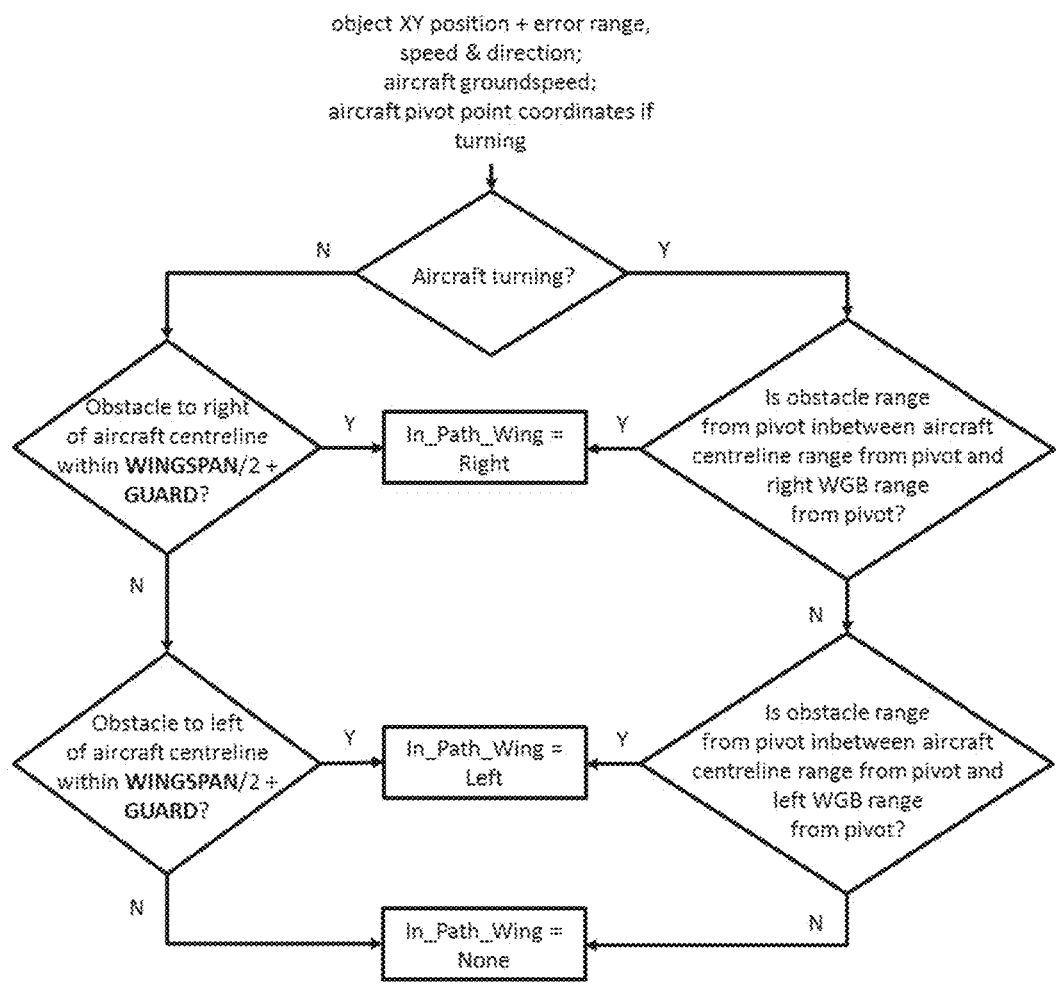
FIG. 15 shows the logical flow to find if an obstacle is currently in the aircraft path.

FIG. 15 shows the logical flow.

The distance of the obstacle ahead of the aircraft is not considered until Steps S8 and S9.

Aircraft Not Turning

Figure 16:
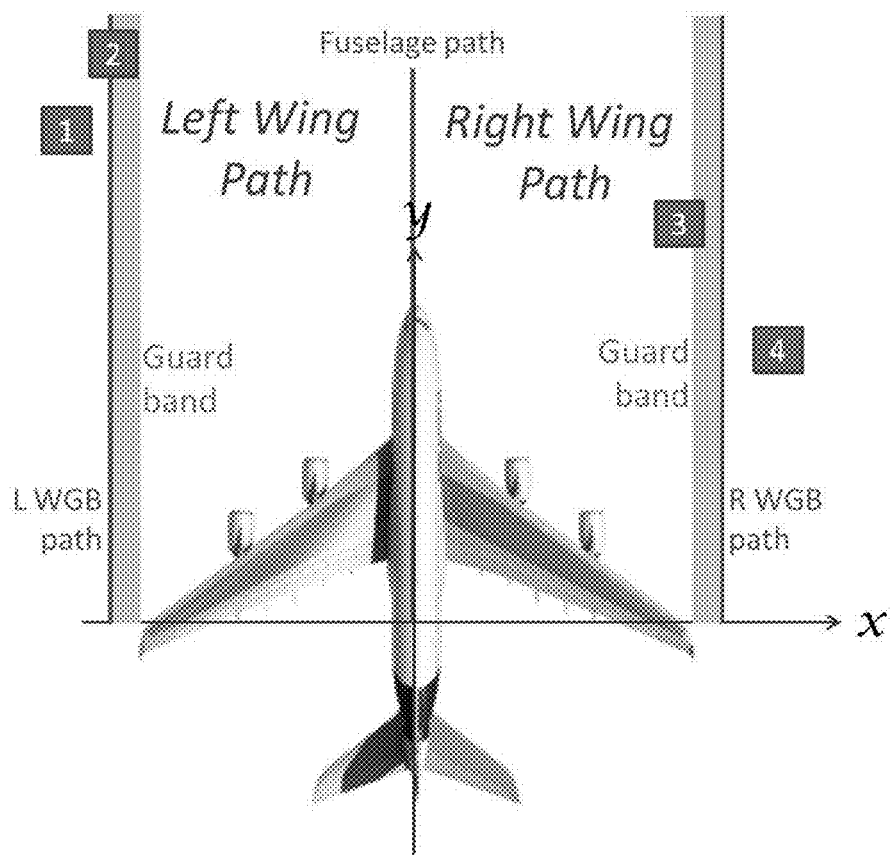
FIG. 16 illustrates obstacle positions in and outside straight aircraft path.

If the aircraft is determined not to be turning, then the obstacle is assessed as currently being in the path of the left wing, the right wing, or neither, simply by comparing the x-coordinate of the obstacle's current position and the x-coordinate of the nearest WGB, which is given directly by Equation 22 for the straight-ahead travel case. Obstacles 2 and 3 in FIG. 16 are in the left and right wing's path respectively.

Aircraft Turning

Figure 17:
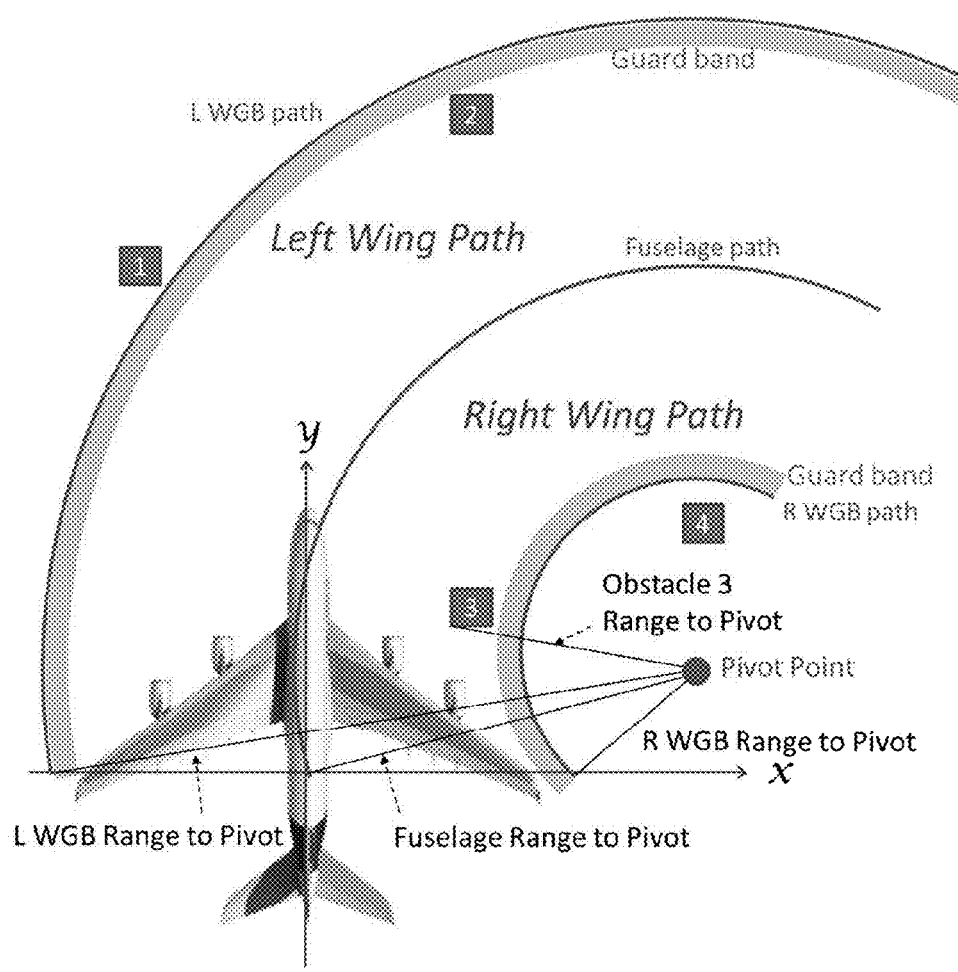
FIG. 17 illustrates obstacle positions in and outside turning aircraft path.

If the aircraft is determined to be turning, then the obstacle X-Y position is translated to polar coordinates relative to the aircraft pivot point, as described with reference to equations 11 to 13. If the range of the obstacle to the pivot is inbetween the ranges of the left Wingtip Guard Boundary (WGB) and the aircraft centreline, then the obstacle is currently in the path of the left wing (see e.g. obstacle 2 in FIG. 17). If the range of the obstacle to the pivot is between the ranges of the right WGB and the aircraft centreline, then the obstacle is currently in the path of the right wing (see e.g. obstacle 3 in FIG. 17).

Figure 18:
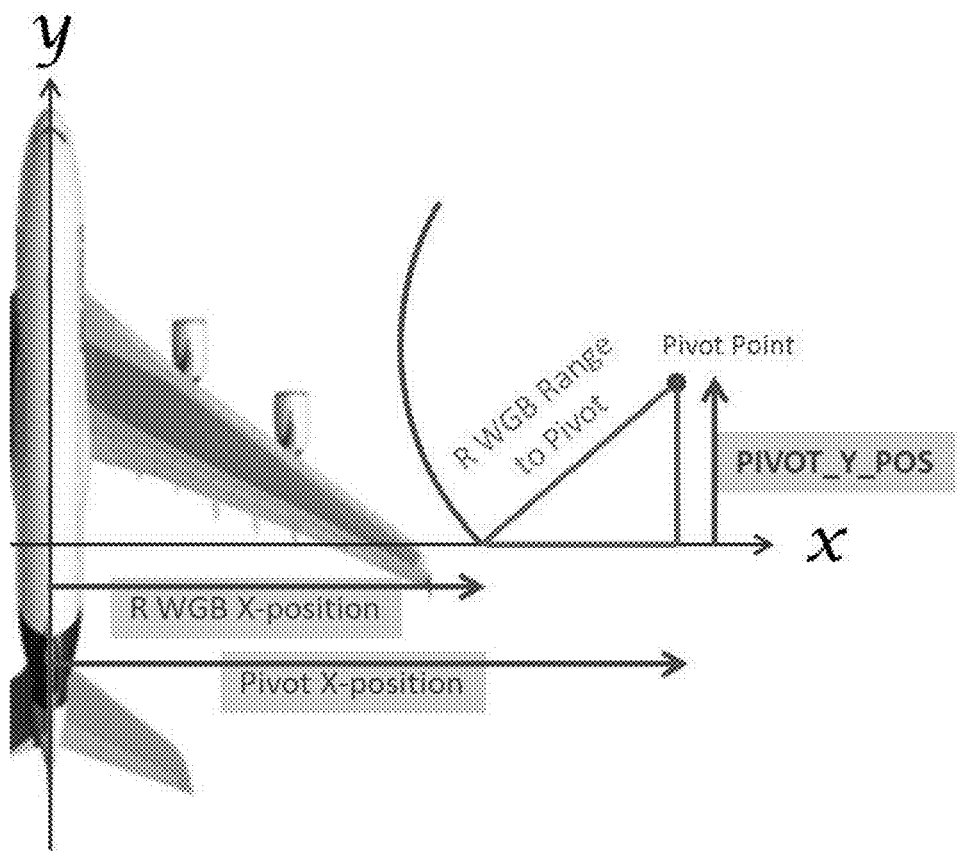
FIG. 18 shows the Right Wingtip Guard Boundary range from the pivot point.

The range from each WGB to the pivot is calculated as $$\sqrt{(x_{WBG} - x_{pivot})^2 + y_{pivot}^2} \qquad \text{Equation 23}$$

as illustrated in FIG. 18. Note that this calculation is performed with $y_{WGB}=0$, that is with respect to the aircraft's current position.

Figure 19:
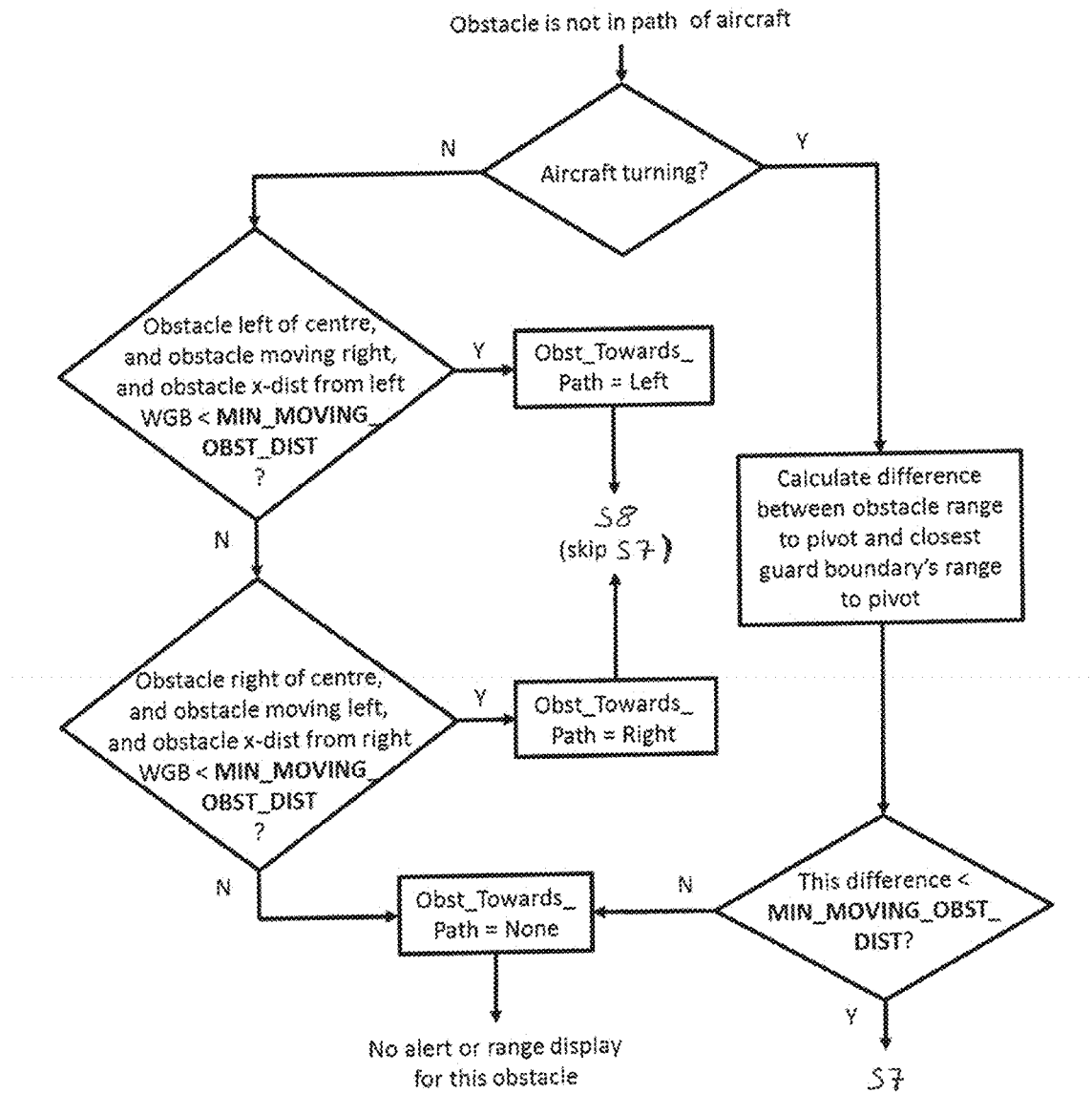
FIG. 19 shows the logical flow to determine whether an obstacle is close enough to the aircraft path to consider.

Step S6 of FIG. 5 determines if the obstacle is close enough to the aircraft path to consider. If an obstacle is not currently on the aircraft path, it may pose a collision threat if it is moving into the aircraft path. To avoid nuisance faults, the algorithm builds in the facility to exclude very distant moving obstacles from consideration by the obstruction detection algorithms, even if they appear to be on course for the aircraft path. This is illustrated by the logical flow shown in FIG. 19.

Step S7 of FIG. 5 determines if the obstacle is on course for the aircraft path. This calculation is only performed if the obstacle is not currently in the path of the aircraft and if the obstacle appears to be moving in a straight line; see the discussion in relation to step S1. The obstacle speed is provided to this function as a scalar value, along with the obstacle heading in degrees relative to the forward direction of the aircraft.

Aircraft Not Turning

The TSAS 1 measures the x-coordinate component of the obstacle's current distance outside the straight-line path of the nearest WGB. It then predicts the obstacle's position at a time in the future, when it has moved 5 m at its current velocity. If this predicted position is closer than the initial position, the obstacle is moving towards the aircraft path, and the TSAS 1 calculates the time (the Obstacle ETA) and position at which the obstacle will reach the WGB path.

Aircraft Turning

The test follows the same principles as the 'not turning' variant, and uses the range from the pivot point in place of the X-coordinate as the basis for comparing obstacle position with aircraft path.

Figure 20:
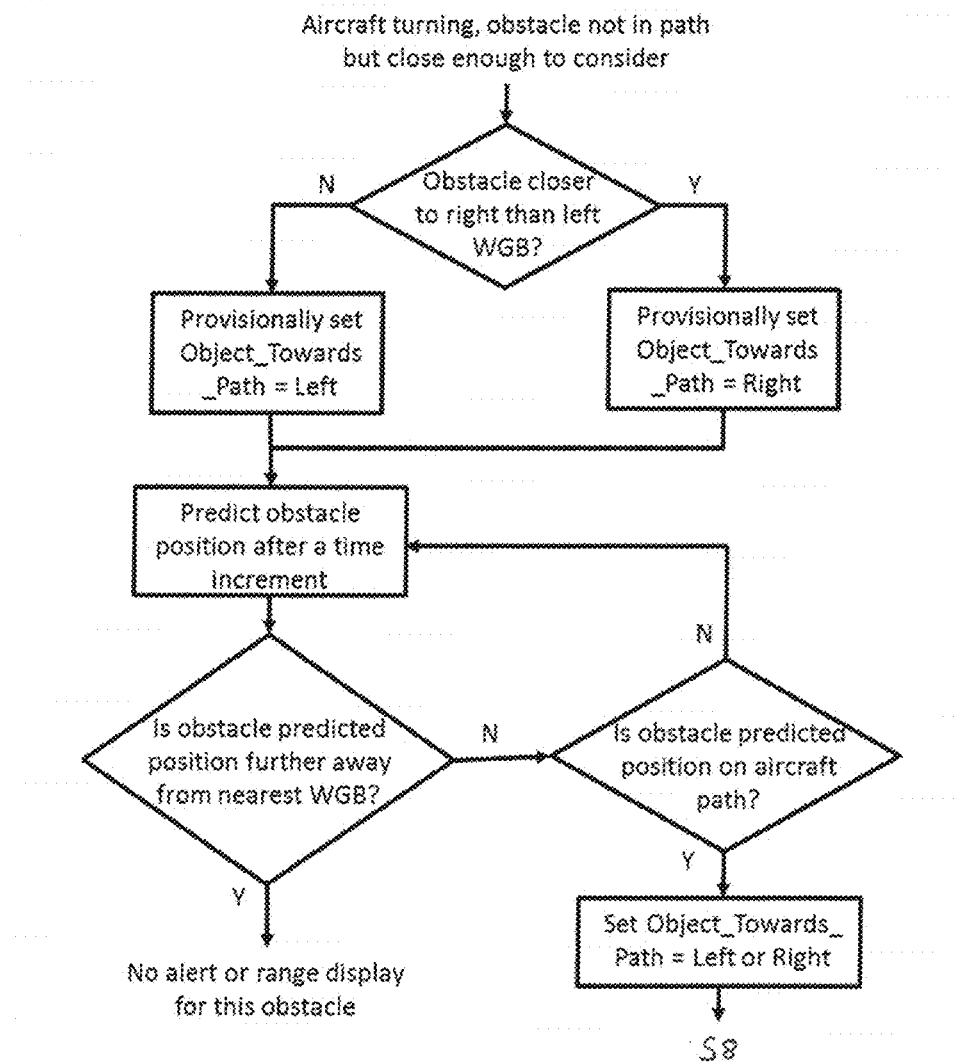
FIG. 20 shows the logical flow to determine if a moving obstacle is on course for the aircraft path.

This logical flow is illustrated in FIG. 20.

Step S8 of FIG. 5 determines if the obstacle will reach the path before the aircraft moves past.

To avoid nuisance faults, no alert is generated for an obstacle that will reach the aircraft path after the aircraft has passed that point. In order to determine whether the obstacle will miss the aircraft, the longitudinal distance of concern behind the wingtip is assumed to be the wing 'breadth' in the y-direction, taken as 5 m in this example. It is also assumed that if the aircraft is currently decelerating, it will continue to decelerate at a constant rate. Otherwise, it is assumed to maintain its current speed. Positive acceleration is ignored.

Note that the usual pilot response to a TSAS alert is assumed to be braking to stop the aircraft, but that different pilot action would be necessary to avoid a collision with an obstacle travelling towards the location where a wing will stop if the pilot stops the aircraft. Also note that braking in response to one obstacle ahead of the aircraft—or for any other reason—may cause a TSAS alert in response to an obstacle on course for a location just ahead of the wing. Despite these complications, it is deemed beneficial to the flight crew to draw attention to an obstacle whose current course can be confidently predicted to take it into the aircraft's path.

Figure 21:
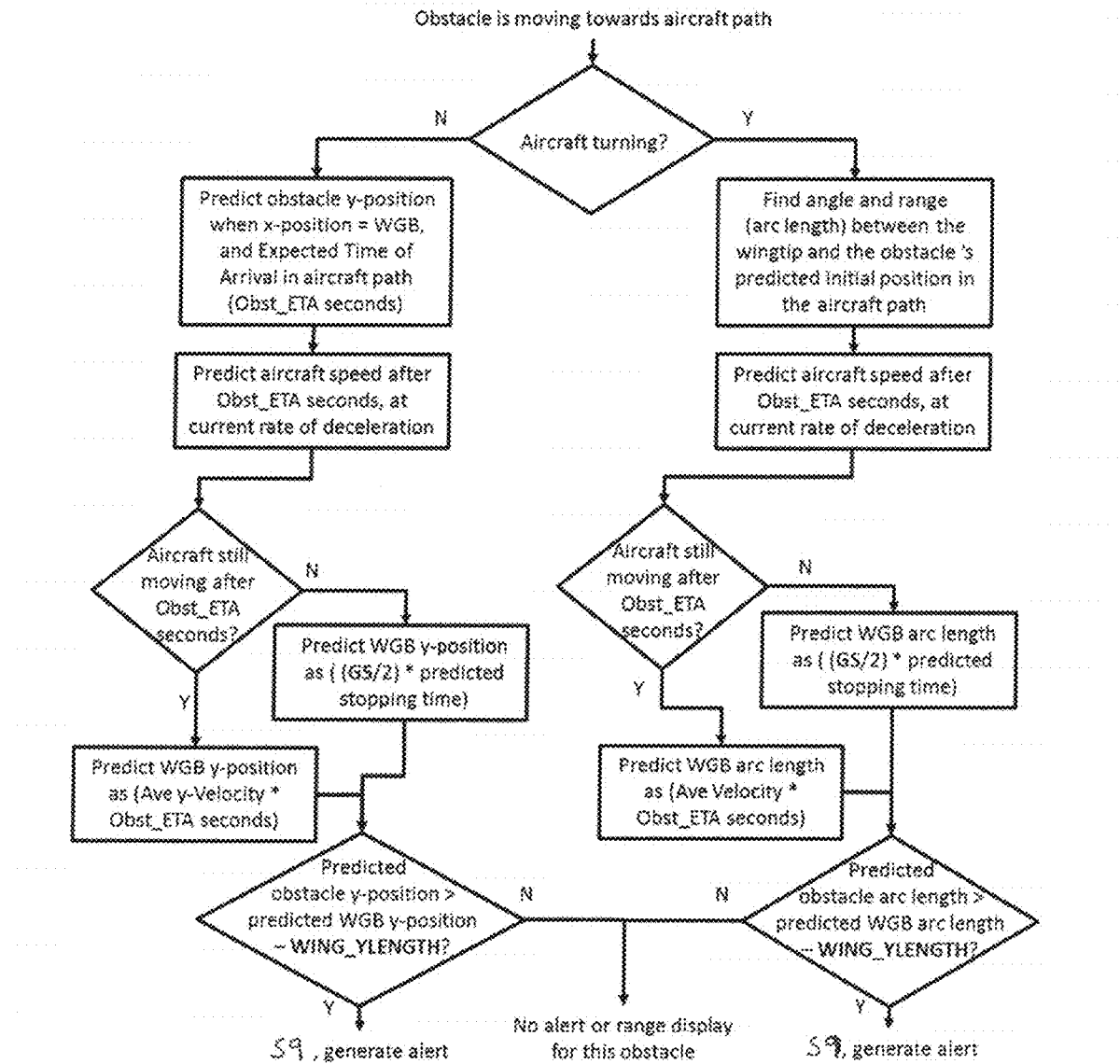
FIG. 21 shows the logical flow to determine if the obstacle will reach the path before the aircraft moves past.

The logical flow for this process is shown in FIG. 21.

Step S9 of FIG. 5 generates an alert if the time till braking is required is below a threshold.

Once the obstacle is known to be either in the path of the aircraft or heading into the path of the aircraft, it is considered to be an obstruction. After the obstacle's initial position in the aircraft path has been established (either current position or predicted position where it will arrive at the edge of the aircraft path), it is necessary to consider the distance and time between the aircraft and the obstacle so that the correct alert can be generated. The flowchart of FIG. 22 illustrates the process.

Figure 22:
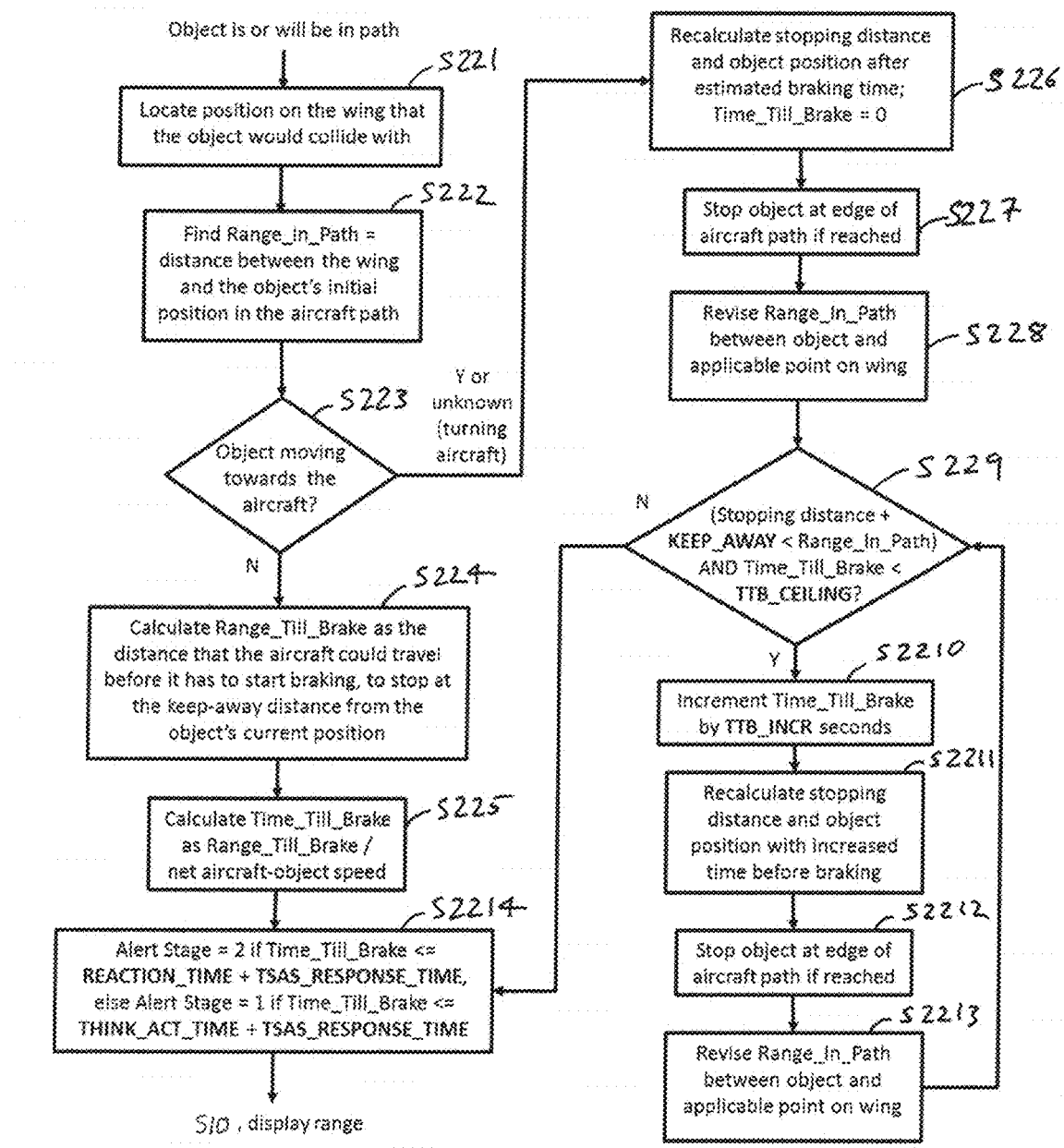
FIG. 22 shows the logical flow to generate an alert.

Step S221 of FIG. 22 locates the position on the wing that the object would collide with.

If the aircraft is not turning, $x_{obstacle} = x_{wingtouch}$, and $y_{wingtouch}$ is calculated from the applicable equation above.

Figure 23:
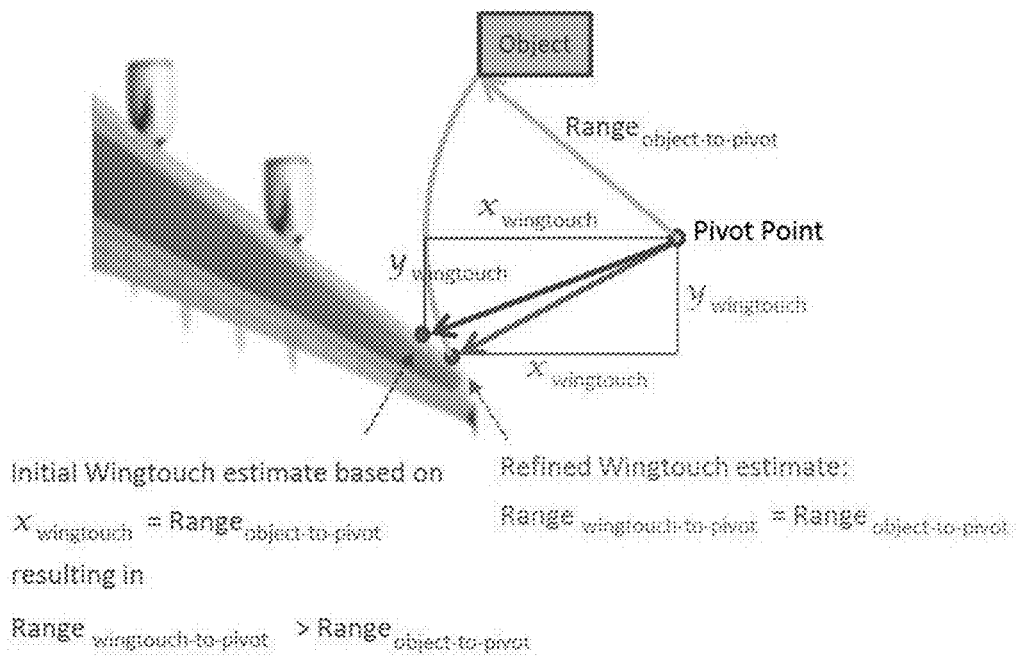
FIG. 23 illustrates wingtouch estimation and refinement.

If the aircraft is turning, the wingtouch point is the point on the wingline whose range to the pivot point is the same as the range from the obstacle to the pivot point. If the pivot point is on the right of the aircraft, as illustrated in FIG. 23, this can be approximated by setting $$x_{wingtouch} = x_{pivot} - \text{Range}_{object-to-point} \quad \text{Equation 24}$$

and if on the left, $$x_{wingtouch} = -x_{pivot} + \text{Range}_{object-to-point} \quad \text{Equation 25}$$

This will result in an approximation of $y_{wingtouch}$ accurate to within a few meters, that can be refined by calculating the error as the difference between $\text{Range}_{object-to-wingtouch}$ and $\text{Range}_{object-to-pivot}$, shifting $x_{wingtouch}$ by this amount in the correct direction, and repeating until the error is reduced to a negligible limit.

Step S222 of FIG. 22 calculates the Range In Path of the obstacle. The Range In Path is initially calculated as the length of the path between the current position of the applicable point on the wing, and the obstacle's current position (or the position where it will enter the aircraft path, if it is currently outside the path).

Note: if the obstruction is moving towards the aircraft, the Range In Path must later be recalculated to account for obstacle and aircraft movement during the braking time and the time until braking begins, which in turn depend upon the Range In Path itself. This is illustrated in steps S226, S227 and S228 of FIG. 22. If the aircraft is not turning, $$\text{Range In Path} = y_{object} - y_{wingtouch} \quad \text{Equation 26}$$

If the aircraft is turning, the Range In Path is the length of an arc around the circle whose radius is equal to both $\text{Range}_{obstacle-to-pivot}$ and $\text{Range}_{wingtouch-to-pivot}$, which is calculated using the rule (arc length/circumference of circle)= (arc angle in degrees/360 degrees):

$$\text{Range In Path} = \text{abs(Angle In Path)} \times \frac{2\pi}{360} \times \text{Range}_{object-to-pivot} \quad \text{Equation 27}$$

where abs(Angle In Path) is the magnitude of $$\text{Angle In Path} = \text{Angle}_{object-about-pivot} - \text{Angle}_{wingtouch-about-pivot} \quad \text{Equation 28}$$

Note that Angle In Path is positive when the aircraft is turning right and both the obstruction and 'wingtouch' angles about the pivot point are negative, and negative when the aircraft is turning left and both the obstacle and 'wingtouch' angles about the pivot point are positive.

Time Till Brake

The key quantity that must be determined to generate the correct alert is Time Till Brake, defined as the time that the aircraft can continue at its current speed before it has to begin braking in order to stop at the keep-away distance away from the obstruction.

Step S223 of FIG. 22 determines if the object is moving towards the aircraft.

Figure 24:
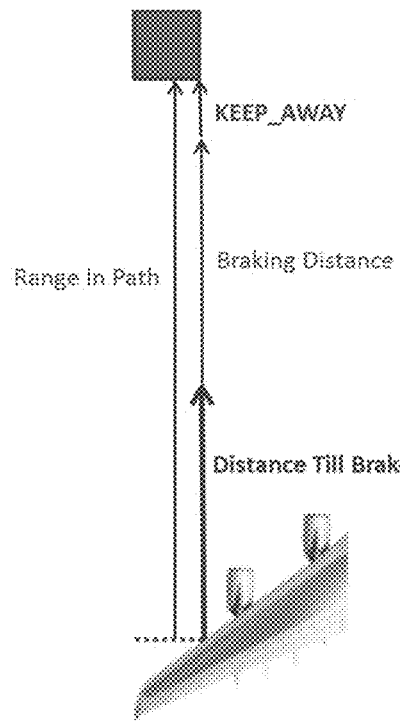
FIG. 24 illustrates the Distance Till Brake calculation: obstruction not approaching, aircraft not turning.

If the obstruction is not moving towards the aircraft and the aircraft is not turning, then Time Till Brake is calculated directly from Distance Till Brake, the distance that the aircraft can travel at its current speed before braking must begin, using the following equations (illustrated in FIG. 24):

$$\text{Distance Till Brake} = \text{Range In Path} - \text{Braking Distance} - \text{KEEP\_AWAY} \quad \text{Equation 29}$$

$$\text{Time Till Brake} = \frac{\text{Distance Till Brake}}{\text{Groundspeed}} \quad \text{Equation 30}$$

This processing corresponds to steps S224 and S225 of FIG. 22.

Figure 25:
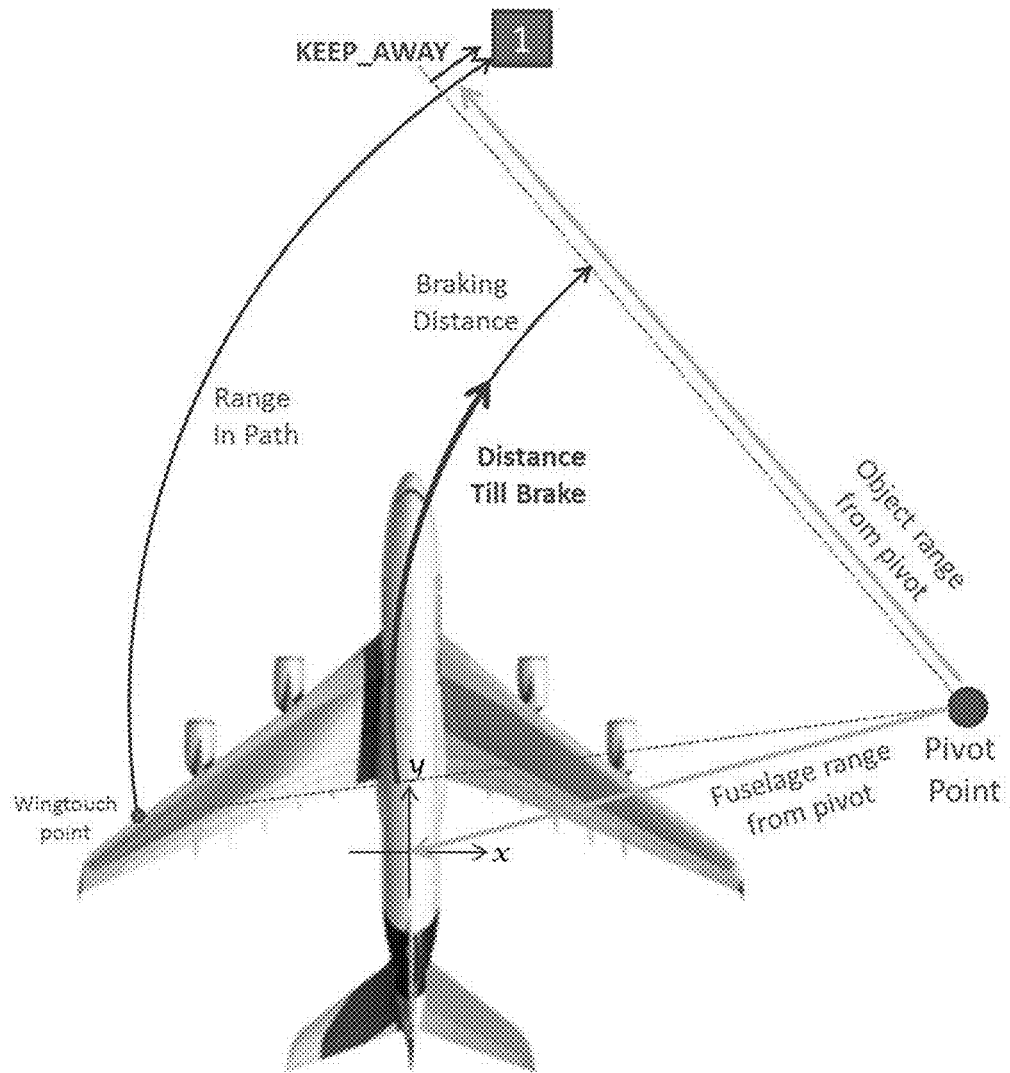
FIG. 25 illustrates the Distance Till Brake calculation: left wing obstruction stationary, aircraft turning.
Figure 26:
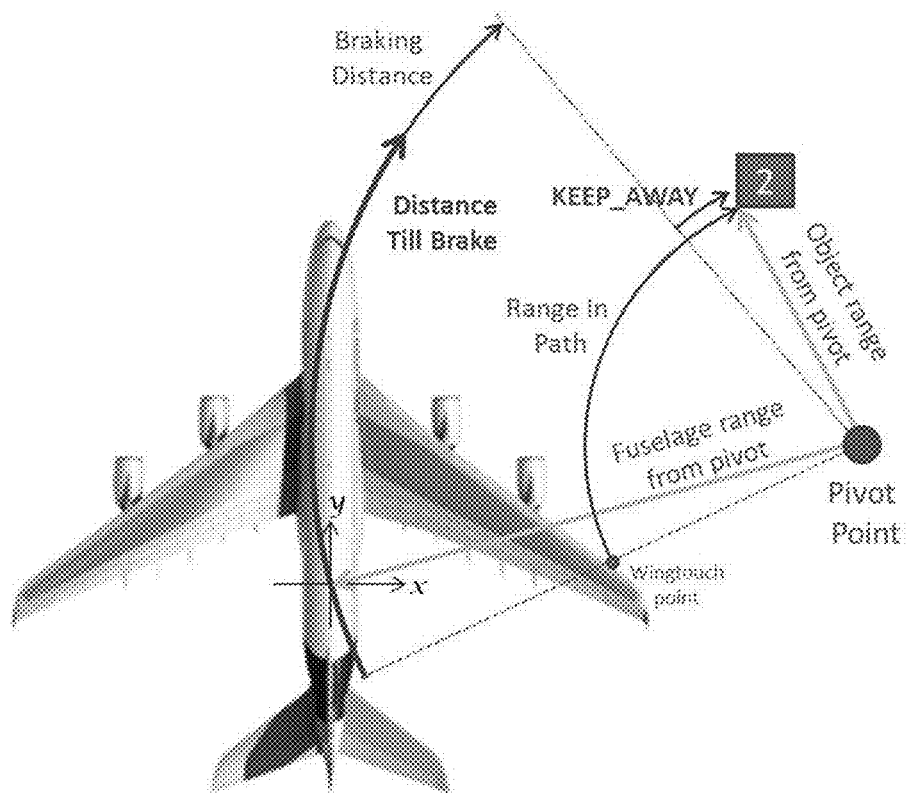
FIG. 26 illustrates the Distance Till Brake calculation: right wing obstruction stationary, aircraft turning.

If the obstruction is stationary and the aircraft is turning, then Distance Till Brake is calculated in a similar way as for straight line travel. However, Range In Path and the Keep Away Distance are distances relative to the wingtouch point, and Braking Distance and Distance Till Brake are based upon movement of the fuselage at the Groundspeed reported on the aircraft bus. This is illustrated by FIG. 25 for an obstruction (numbered 1) in front of the wing that is moving faster than the fuselage, and by FIG. 26 for an obstruction (numbered 2) in front of the wing that is moving slower than the fuselage.

Therefore, Range In Path and the Keep Away Distance need to be multiplied by a scaling factor to account for the difference in speed between the aircraft fuselage and the wingtouch point, resulting in the equation:

$$\text{Distance Till Brake} = \left((\text{Range In Path} - \text{KEEP\_AWAY}) \times \frac{\text{Fuselage range from pivot}}{\text{Object range from pivot}}\right) - \text{Braking Distance} \quad \text{Equation 31}$$

Time Till Brake is then calculated as Distance Till Brake divided by aircraft groundspeed, as per equation 30.

This processing also corresponds to steps S224 and S225 of FIG. 22.

If the obstruction is, or may be, moving towards the aircraft, processing proceeds to step S226 of FIG. 22.

Any obstruction movement towards the aircraft from its initial position in the aircraft path reduces Time Till Brake, and causes an alert to be generated sooner. Predicted obstruction movement is considered in the calculation of Time Till Brake, if the obstacle heading is <−90° or >90° and the aircraft is not turning, or if the obstacle is moving and the aircraft is turning in which case the obstruction may end up moving towards the aircraft in the near future.

If the obstruction is moving away from the aircraft, this does not increase the time before the TSAS 1 generates an alert, since the obstacle may stop moving; instead, the alert is based on the obstruction's current position, or its initial predicted position on the edge of the aircraft path if not already in it.

The Wingtouch Stopping Distance and the obstruction's Range In Path are calculated iteratively, firstly to account for obstacle and aircraft movement during the braking time only and then with gradually increasing values of Time Till Brake, until the distance between the obstruction and wing is no more than the keep-away distance. This is shown in steps S229, S2210, S2211, S2212 and S2213 of FIG. 22.

Note: Wingtouch Stopping Distance is equivalent to the sum of Range Till Brake and Braking Distance shown in FIG. 24.

Alert Stage

As shown in step S2214 of FIG. 22, if Time Till Brake is less than (System Response Time+Pilot Reaction Time) seconds, a second stage alert is generated; otherwise if it is less than (System Response Time+Pilot Think & Act Time), a first stage alert is generated; otherwise no alert is generated.

If there is more than one obstruction in the path of the same side of the aircraft, the alert (and the range display described in relation to step S10 of FIG. 5 below) will be based upon the one producing the lowest value of Time Till Brake.

Step S10 of FIG. 5 displays the range to the current position of an obstruction.

Whether or not an alert is generated, the range to the obstruction's current position is displayed if it is or will be in the aircraft's path, provided the Time Till Brake is less than the constant RNG_DISP_MAX_TTB. The purpose of this display is to assist the flight crew to identify quickly which object has triggered the alert. The displayed range is rounded down with a resolution of 5 m or 15 ft, since the pilot's own visual assessment and Air Traffic Control assistance are the only acceptable means of assessing clearance past or around an obstruction.

Whether the aircraft path to the obstruction is straight or curved, and whether the obstruction is already in the path or travelling towards it, the displayed range is measured in a straight line from the 'wingtouch' point (the point on the wing leading edge that the obstruction is predicted to collide with) to the current position of the obstruction.

Once displayed, each range display (one for each wing) is updated once a second for a given obstruction so that the pilot is not required to taxi 'head down' in order to interpret the display.

Figure 27:
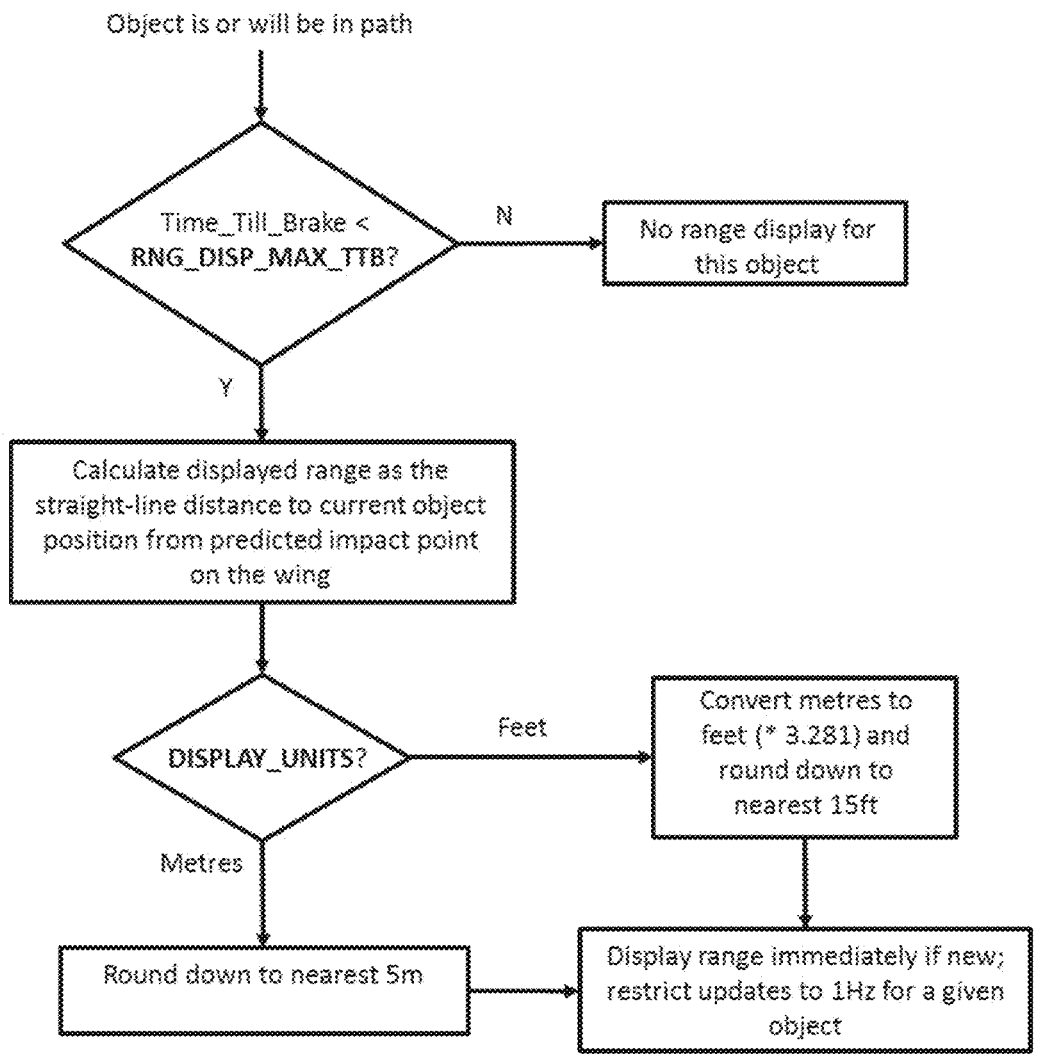
FIG. 27 shows the logical flow to display a range value.

The logical flow for step S10 is shown in FIG. 27.

The invention claimed is:

1. An aircraft ground collision detection system comprising:
    an object detection device for mounting on an aircraft and arranged to detect objects and output a location and object velocity information of each detected object; and
    a processor arranged to:
    receive a ground speed of the aircraft and a heading of the aircraft and the detected location of each detected object;
    predict the aircraft's path based on the ground speed and the heading;
    compare the predicted aircraft path with the object locations;
    output an alert based on the overlap or proximity of the predicted aircraft path with the object locations;
    receive the object velocity information;
    predict each detected object's path based on the object's location and velocity;
    compare the predicted aircraft path with the predicted object paths; and
    output an alert based on overlap or proximity of the predicted aircraft path with the predicted object path;
    wherein the processor is arranged to assess object movement for straightness, and if an object is determined to be moving on a non-straight path, its velocity is set to zero for further analysis.

2. An aircraft ground collision detection system as claimed in claim 1, wherein the processor is arranged to predict the aircraft path as a curve when the aircraft is turning.

3. An aircraft ground collision detection system as claimed in claim 2, wherein the curve is estimated based on change in heading with time.

4. An aircraft ground collision detection system as claimed in claim 1, wherein the processor is arranged to predict all moving object paths as straight lines.

5. An aircraft ground collision detection system as claimed in claim 1, wherein the processor is arranged to calculate object velocity by combining a radial velocity component from the object detection device and non-radial components from change in object position over time.

6. An aircraft ground collision detection system as claimed in claim 1, wherein the processor is arranged to compare the predicted aircraft path with the predicted object paths using an iterative process that iteratively predicts aircraft and object positions along their respective paths at points in time and compares the proximity of the aircraft to the objects at each point in time.

7. An aircraft ground collision detection system as claimed in claim 6, wherein the points in time are separated by a time interval of between 0.1 seconds and 1 second, preferably about 0.5 seconds.

8. An aircraft ground collision detection system as claimed in claim 7, wherein the processor is arranged to generate no alert where the object does not reach the aircraft's predicted path until after the aircraft is predicted to have passed the intersection of the paths.

9. An aircraft ground collision detection system as claimed in claim 1, wherein the aircraft path is treated as a swept volume of a shape corresponding to the aircraft wing shape.

10. An aircraft ground collision detection system as claimed in claim 9, wherein the aircraft path includes guard bands either side of the wingtips, preferably at least 1 m in width.

11. An aircraft ground collision detection system as claimed in claim 1, wherein the processor is arranged to assess the aircraft path for straightness, and wherein if the aircraft path is straight, a coordinate system centered on the aircraft is used, and if the aircraft path is curved, a coordinate system centered on a center of the turning circle is used.

12. An aircraft ground collision detection system as claimed in claim 1, wherein the processor is arranged to generate three levels of information or alert, each level associated with a different range of times until braking is required to avoid a collision.

13. A method of detecting collisions for a grounded aircraft, the method comprising:
    detecting location of objects around the aircraft;
    detecting groundspeed and heading of the aircraft;
    predicting the aircraft's path based on the ground speed and the heading;
    comparing the predicted aircraft path with the object locations;
    outputting an alert based on overlap or proximity of the predicted aircraft path with the object locations;
    receiving object velocity information for detected objects;
    predicting each detected object's path based on the object's location and velocity;
    comparing the predicted aircraft path with the predicted object paths;
    assessing object movement for straightness, and if an object is determined to be moving on a non-straight path, setting velocity of the object to zero for further analysis: and
    outputting an alert based on overlap or proximity of the predicted aircraft path with the predicted object path.

14. A method of detecting collisions for a grounded aircraft, the method comprising:
    detecting location of objects around the aircraft;
    detecting groundspeed and heading of the aircraft;
    predicting the aircraft's path based on the ground speed and the heading, wherein predicting the aircraft's path includes assessing the aircraft's path for straightness, and wherein if the aircraft's path is straight, a coordinate system centered on the aircraft is used, and if the aircraft's path is curved, a coordinate system centered on a center of a turning circle is used;
    comparing the predicted aircraft's path with the object locations; and
    outputting an alert based on overlap or proximity of the predicted aircraft's path with the object locations.

15. An aircraft ground collision detection system comprising:
    an object detection device for mounting on an aircraft and arranged to detect objects and output a location of each detected object; and a processor arranged to:
    receive a ground speed of the aircraft and a heading of the aircraft and the detected location of each detected object;
    predict the aircraft's path based on the ground speed and the heading; compare the predicted aircraft path with the object locations; and output an alert based on the overlap or proximity of the predicted aircraft's path with the object locations;
    wherein the processor is arranged to assess the aircraft's path for straightness, and wherein if the aircraft's path is straight, a coordinate system centered on the aircraft is used, and if the aircraft's path is curved, a coordinate system centered on a center of a turning circle is used.

16. An aircraft ground collision detection system as claimed in claim 15, wherein the processor is arranged to predict the aircraft path's as a curve when the aircraft is turning, and wherein the curve is estimated based on change in heading with time.

17. An aircraft ground collision detection system as claimed in claim 15, wherein the aircraft's path is treated as a swept volume of a shape corresponding to the aircraft wing shape.

18. An aircraft ground collision detection system as claimed in claim 15, wherein the processor is arranged to generate three levels of information or alert, each level associated with a different range of times until braking is required to avoid a collision.

* * * * *